United States Patent
Vu et al.

(10) Patent No.: US 11,568,257 B2
(45) Date of Patent: Jan. 31, 2023

(54) SECURE CLOUD-BASED MACHINE LEARNING WITHOUT SENDING ORIGINAL DATA TO THE CLOUD

(71) Applicant: VMware, Inc., Palo Alto, CA (US)

(72) Inventors: Lan Vu, San Jose, CA (US); Dimitrios Skarlatos, Palo Alto, CA (US); Aravind Bappanadu, Sunnyvale, CA (US); Hari Sivaraman, Livermore, CA (US); Uday Kurkure, Los Altos Hills, CA (US); Vijayaraghavan Soundararajan, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 902 days.

(21) Appl. No.: 16/417,139

(22) Filed: May 20, 2019

(65) Prior Publication Data
US 2020/0372360 A1 Nov. 26, 2020

(51) Int. Cl.
*G06N 3/08* (2006.01)
*G06N 3/04* (2006.01)
*H04L 9/06* (2006.01)
*H04L 9/40* (2022.01)
*H04L 9/00* (2022.01)

(52) U.S. Cl.
CPC ........... *G06N 3/084* (2013.01); *G06N 3/04* (2013.01); *H04L 9/0637* (2013.01); *H04L 63/0428* (2013.01); *H04L 9/50* (2022.05)

(58) Field of Classification Search
None
See application file for complete search history.

(56) References Cited

U.S. PATENT DOCUMENTS

| 2012/0233684 A1* | 9/2012 | Denis | H04W 12/069 726/9 |
| 2017/0372201 A1* | 12/2017 | Gupta | G06N 3/0454 |
| 2018/0018590 A1* | 1/2018 | Szeto | G06N 20/10 |

* cited by examiner

*Primary Examiner* — Brandon Hoffman
(74) *Attorney, Agent, or Firm* — Patterson & Sheridan, LLP

(57) ABSTRACT

Method and system for training a neural network. The neural network is split into first and second portions. A k-layer first portion is sent to a client training/inference engine and the second portion is retained by a server training/inference engine. At the splitting point, the kth layer is a one-way function in output computation has a number of nodes that are less than any other layer of the first portion. The client training/inference engine trains the first portion with input data in a set of training data. The server training/inference engine receives a batch of outputs from the client training and applies them to the second portion to train the entire neural network.

21 Claims, 21 Drawing Sheets

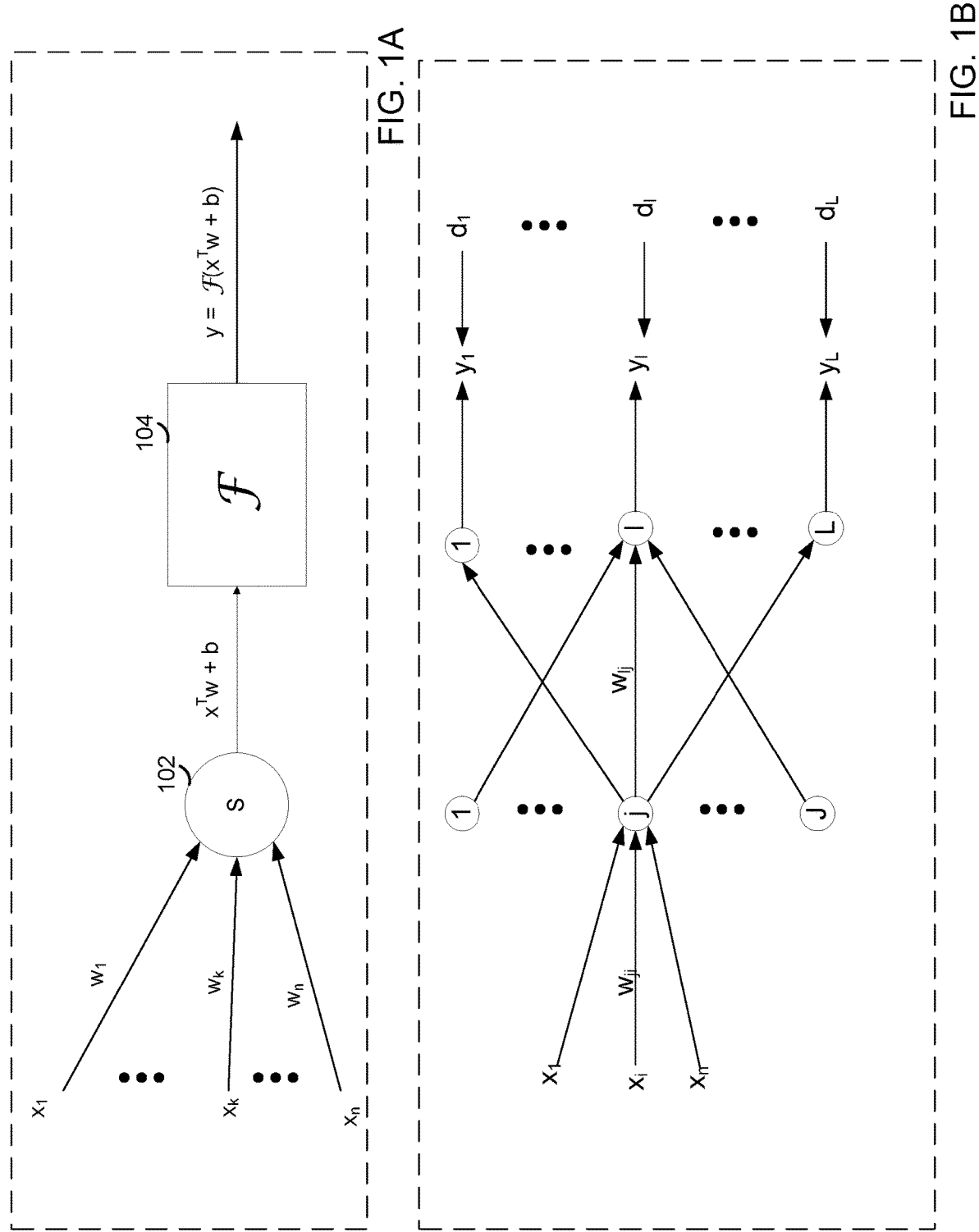

SECURE CLOUD-BASED MACHINE LEARNING WITHOUT SENDING ORIGINAL DATA TO THE CLOUD

BACKGROUND

Machine learning (ML) applications, such as training artificial neural networks and using artificial neural networks to generate output results, have been making a broader and deeper impact into fields like healthcare, security, management, transportation, software, and hardware. While this trend is occurring, another trend is to place and run applications in a cloud environment (e.g., on one or more servers in a cloud) or build them natively in the cloud to improve flexibility in deployment and cost savings. However, placing machine-learning applications in the cloud can subject such applications to vulnerabilities. In the cloud, these applications receive data from a source (e.g., computing device) outside the cloud or outside a tenant of the same cloud and provide results to an output (e.g., computing device) outside the cloud or outside the tenant, thereby exposing the data and output results of the neural network to observers outside the cloud or outside the tenant of the same cloud and making the training and inference of a neural network susceptible to attacks. Some examples of such attacks include, but are not limited to: (1) attackers injecting false data and inputs into the neural network to make false inference results and (2) attackers accessing or stealing data sent from a source for authorized use.

It is desirable to prevent machine learning applications from being vulnerable to a breach while such applications still operate in the cloud. It is also desirable to improve the performance of such machine learning applications.

SUMMARY

An embodiment is a method for training and using a neural network. The method includes splitting the neural network into a first portion and a second portion, the first portion having k layers and the second portion having one or more subsequent layers of the neural network, sending the first portion of the neural network to a client over a communications link, where, upon receipt of the first portion, the client applies one or more sets of inputs to the first portion of the neural network to create a batch of outputs. The method further includes receiving the batch of outputs from the client over the communications link and applying the batch of outputs received from the client to the second portion of the neural network to generate outputs. In some embodiments, the one or more sets of inputs to the first portion of the neural network can be either a number of training inputs for training the first portion or client input data for performing an inference on the first portion. Also, in some embodiments, the batch of outputs can be outputs from the training of the first portion and used to train the second portion or outputs from performing an inference on the first portion and used to perform an inference on the second portion.

An advantage of some embodiments is that original data for training of or inferences using the neural network are not exposed to the cloud or observers of the communication link and thus it is highly unlikely that these data can be observed or copied or used without authorization. Another advantage is that the workload of training of or inference using the neural network can be balanced between a client and a server training/inference engine, thereby improving the performance of training of or inference using the neural network. Yet another advantage is that intermediate data sent between a client training/inference engine and a server training/inference engine in the training/inference process does not include sensitive information, which helps to maintain the privacy of the original data. Yet another advantage is that bandwidth used over a communication link between the client training/inference engine and the server training/inference engine can be reduced, thereby improving the performance of the training of or inference using the neural network. Yet another advantage is that power consumption of edge devices in a cloud containing the server training engine can be reduced by assigning a large portion of the computation to the cloud.

Other embodiments include a computer-readable medium containing instruction for carrying out one or more aspects of the above method, and a system configured to carry out one or more aspects of the above method.

BRIEF DESCRIPTION OF THE DRAWINGS

FIG. 1A depicts a single perceptron.

FIG. 1B depicts a two-layer neural network containing perceptrons.

DETAILED DESCRIPTION

An artificial neural network (ANN) is a computational model comprised of densely interconnected adaptive processing units.

FIG. 1A depicts a single perceptron, which is the simplest case of an adaptive processing unit. The perceptron has an output y at which the desired value is produced, an activation function $\mathcal{F}$ 104, a summation function, S 102, which has a set of inputs $x^k$, each with a weight parameter $w^k$, where k=[1 ... n] designates the kth set of inputs and weight parameters, and a bias vector b. Thus, the output of the perceptron is $y^k = \mathcal{F}(S)$, where $x^T w + b$ is the output of the summation function, S 102. The bias vector b is used to set a threshold which must be overcome for a change in outputs $y^k$. The activation function $\mathcal{F}$ 104 can take on a variety of forms. In one embodiment, $\mathcal{F} = 1$ if S≥0 and 0 if S is <0.

In order for the perceptron in FIG. 1A to generate the desired value, a learning rule is specified. One type of learning rule, supervised learning, specifies how to train the perceptron. A common learning rule is equation (1)

$$\begin{cases} w^1 \text{ arbitrary} \\ w^{k+1} = w^k + \rho(d^k - y^k)x^k \end{cases} \quad (1)$$

where ρ is the learning rate, which determines how much of the error $(d^k - y^k)$ is applied to the vector $w^k$ and affects the rate at which the weight parameters converge to a solution. The learning process proceeds as follows. First, an initial weight vector $w^1$ is selected, say at random. Then, a set of m pairs $\{x^k, d^k\}$, k=[1 ... m], called a training set, is used to successively update the weight vector $w^k$ until the output of the perceptron $y^k$ is equal to or close to $d^k$ which are the target values for the output $y^k$. The process of sequentially presenting the training patterns is referred to as cycling through the training set. In general, more than one cycle through the training set is required to determine an appropriate solution vector $w^+$, which is the set of weights that works for each input member of the training set.

An ANN can contain many layers of perceptrons with each layer containing a large number of perceptrons interconnected with the other layers.

FIG. 1B depicts a two-layer fully interconnected network. Each perceptron in the first hidden layer receives an input vector and weights $w_{ji}$, and each perceptron [1 ... L] in the output layer receives an input vector from the outputs of the first hidden layer with weights $w_{ij}$. More complex multi-layer networks include the first hidden layer and output layers depicted in FIG. 1B along with many internal hidden layers between the first hidden layer and output layers. A multi-layer network ANN 220 with layers 202a-o is depicted in FIG. 2A.

Figure 2A:
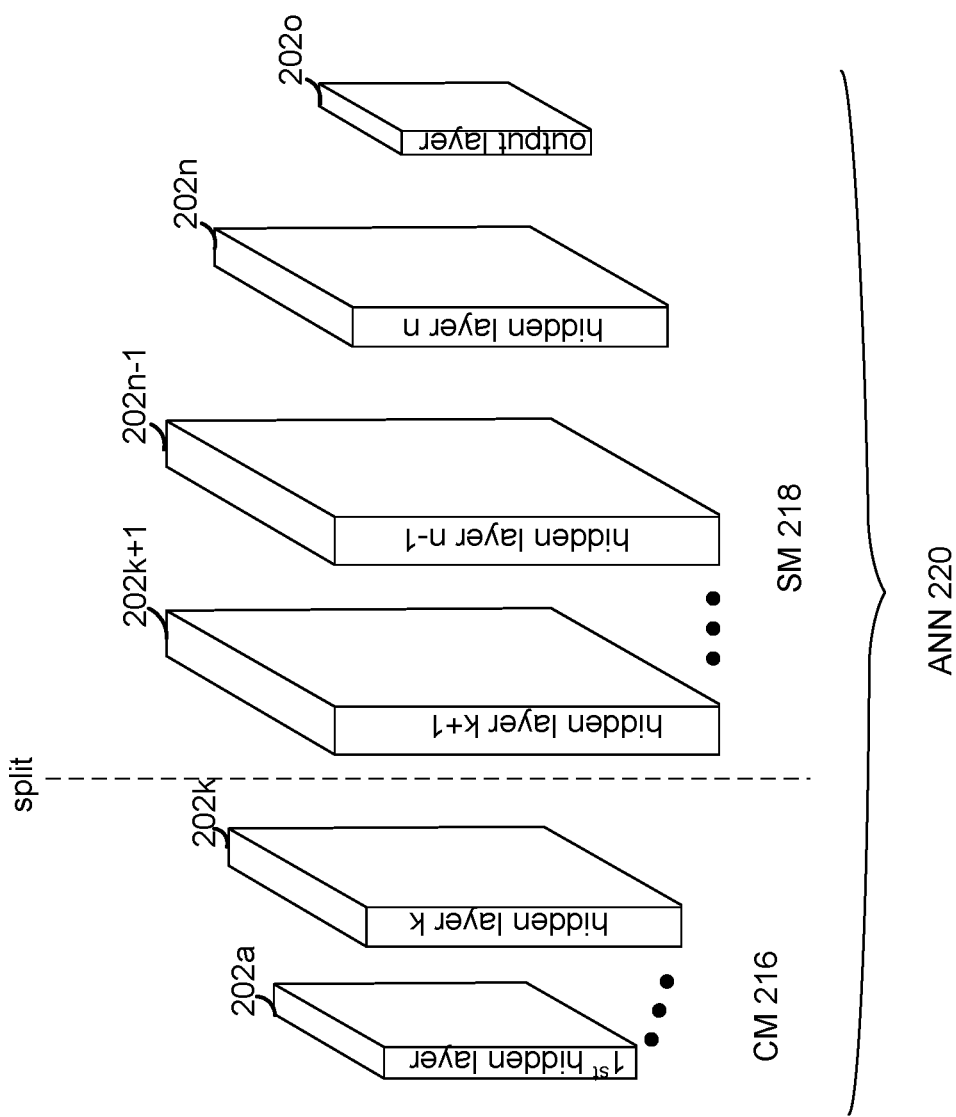
FIG. 2A depicts a multi-layer neural network containing perceptrons.

In FIG. 2A, the ANN 220 includes layers 202a-k and layers 202k+1 to 202n, and layer 202o. The first hidden layer 202a of ANN 220 receives the training input data, and output layer 202o provides the results. As shown, a split separates layers 202k and 202k+1, where k denotes the layer after which the split of ANN 220 occurs. Layers from 202a to 202k comprise client model (CM) 216 and layers 202k+1 to 202n and 202o comprise server model (SM) 218.

Training the network in FIG. 2A is more complex than training a simple perceptron because all of the layers including the hidden layers need to be trained.

Figure 2B:
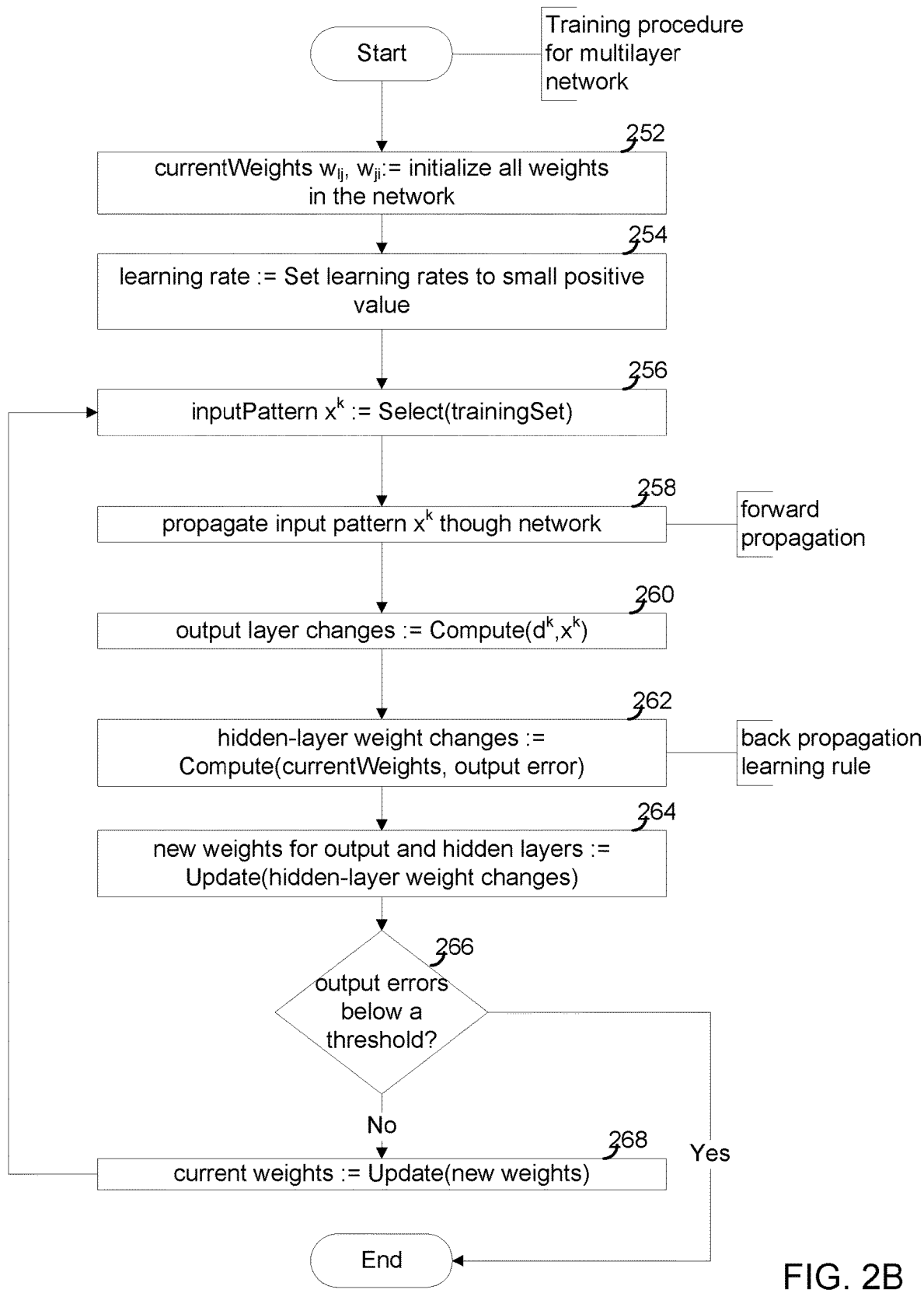
FIG. 2B depicts a flowchart of the operations to train a multi-layer neural network.

FIG. 2B depicts a flow chart of operations for a training procedure for a multi-layer ANN 220. In step 252, the training procedure initializes all of the weights in the network, which become the current weights. In step 254, the training procedure sets the learning rate p to a small positive value. In step 256, the training procedure selects an input pattern from a training set. In step 258, the training procedure propagates the selected input pattern through the entire network. This is called forward propagation. In step 260, the training procedure computes the output layer changes based on the input pattern and the target values. In step 262, the training procedure computes weight changes for all of the hidden layers based on the current weights and the output errors. This is called back propagation. In step 264, the training procedure calculates new weights for all of the layers in the network based on the hidden layer weight changes. In step 266, the training procedure computes the difference between the outputs and the targets to determine whether the differences are below a threshold. If not, then in step 268, the training procedure updates the current weights with the new weights and proceeds back to step 256 to redo the procedure. If the differences are below the threshold, then the process ends, with the new weights being sufficient for use of the ANN 220.

Figure 3A:
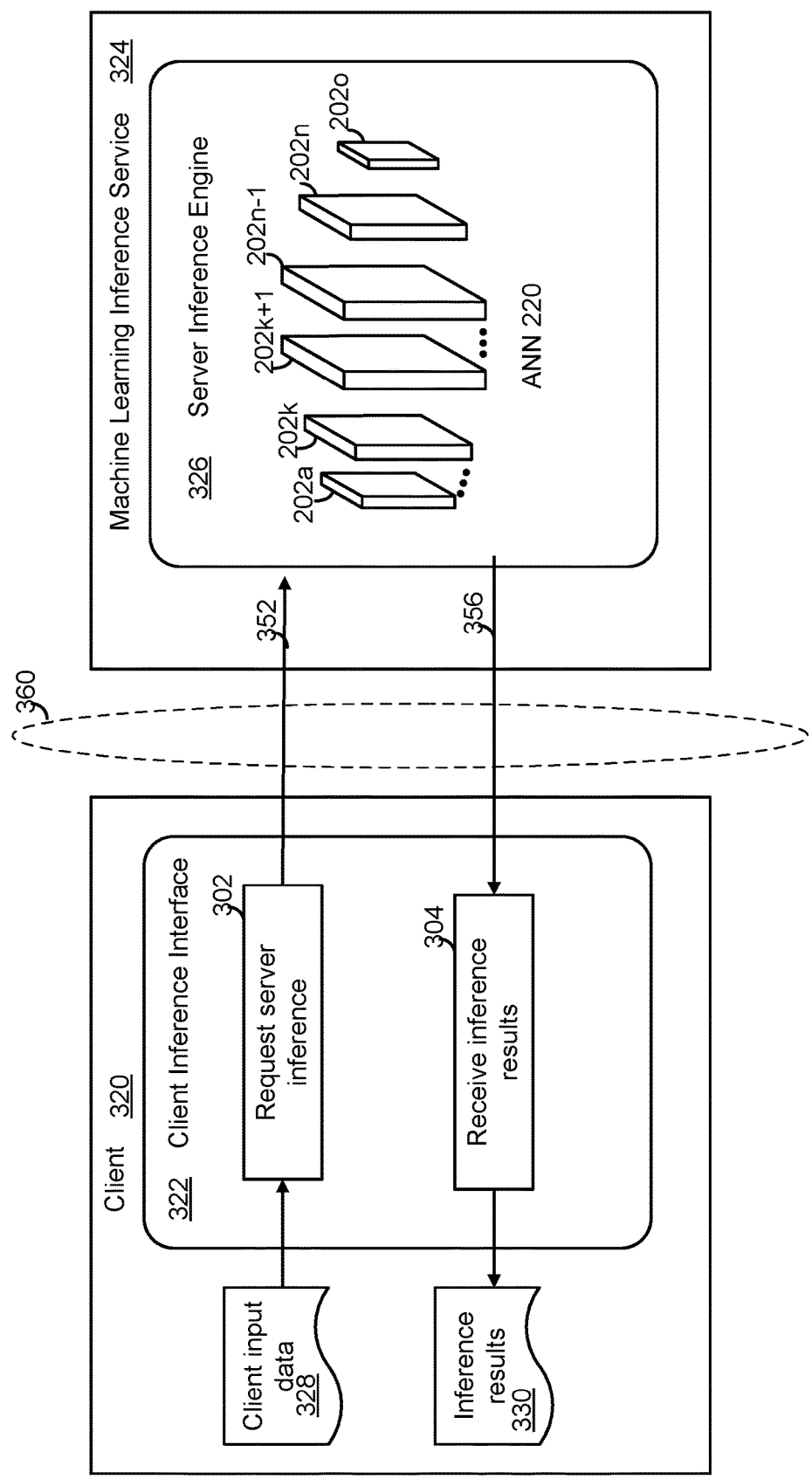
FIG. 3A depicts a client-machine learning inference service, according to the prior art.

FIG. 3A depicts a client-machine learning inference service, according to the prior art. The client 320 includes client input data 328, inference results 330, and a client inference interface 322. The machine learning inference service 324 includes a server inference engine 326, which in turn contains ANN 220 having layers 202a, 202k, 202k+1, 202n-1, 202n and 202o. Client 320 and machine learning inference service 324 use a communications link 360, such as the Internet, to send requests and receive results. An inference operation requested by client inference interface 322 is described in reference to FIGS. 3B and 3C.

In the descriptions that follow, reference is made to a Send('msg' to dest) step and a Received('msg' from source). The Send('msg' to dest) step is an asynchronous, non-blocking communications primitive that sends a message, 'msg' to one or more destinations, 'dest', without regard to the underlying communications mechanism. The message can be any item, including data, data structures, strings, functions, and objects. The Received('msg' from source) step is a predicate that indicates the presence of a message, 'msg' provided by one or more sources, 'source', without regard to the underlying communications mechanism. If the predicate is true, the message contents are available for subsequent use. If the predicate is false, then no message has arrived, and the process may wait until the predicate is true. Alternatively, a process or function with the Received step may test the predicate and if not true, proceed with other steps including retesting the predicate. Any communications protocol, such as a two-phase protocol, can be realized by programs utilizing Send and Receive steps.

Figure 3B:
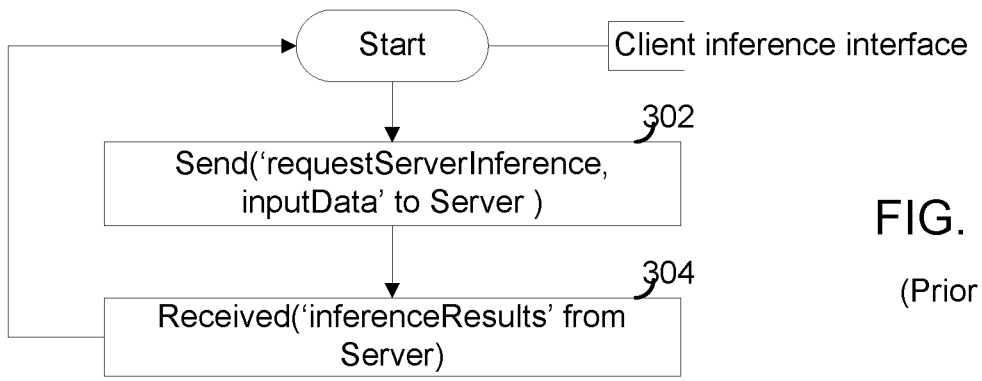
FIG. 3B depicts a flowchart of the operations of a client inference interface, according to the prior art.

FIG. 3B depicts a flowchart of the operations of a client inference interface, according to the prior art. In step 302, client inference interface 322 sends a request and client input data 328 to server inference engine 326. In step 304, client inference interface 322 receives inference results 330 from server inference engine 326.

Figure 3C:
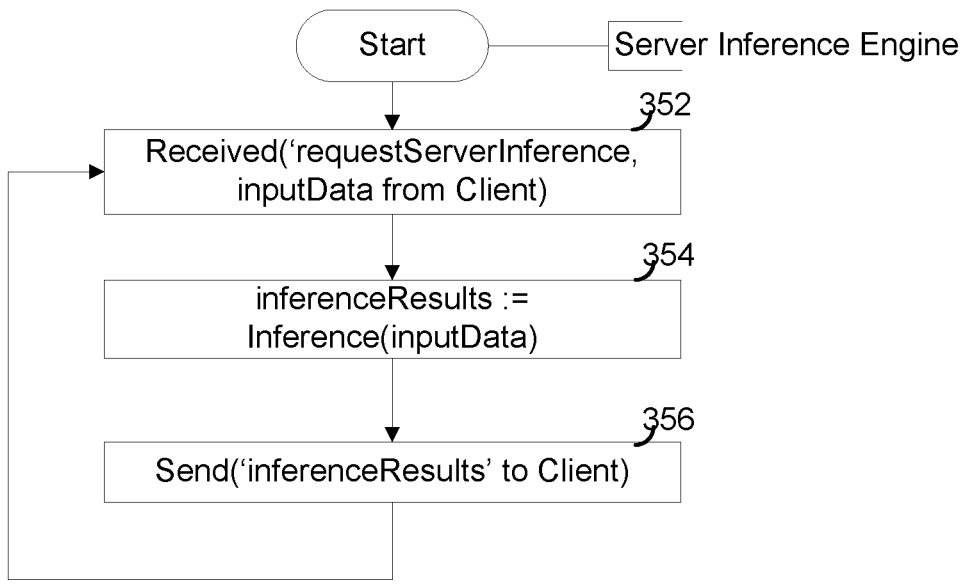
FIG. 3C depicts a flowchart of the operations of a server inference engine, according to the prior art.

FIG. 3C depicts a flowchart of the operations of a server inference engine, according to the prior art. In step 352 of FIG. 3C, server inference engine 326 receives a 'request-ServerInference' message and client input data 328 from client 320. In step 354, server inference engine 326 in response to the request performs an inference on ANN 220 based on client input data 328 and in step 356 sends inference results 330 to client 320.

In FIGS. 3A, 3B and 3C, the machine learning inference service 324 receives client input data 328 over a communications link 360 between client 320 and machine learning inference service 324. Sending client input data 328 over communications link 360 thus exposes client input data 328 to external observation and possible intrusion.

Figure 4A:
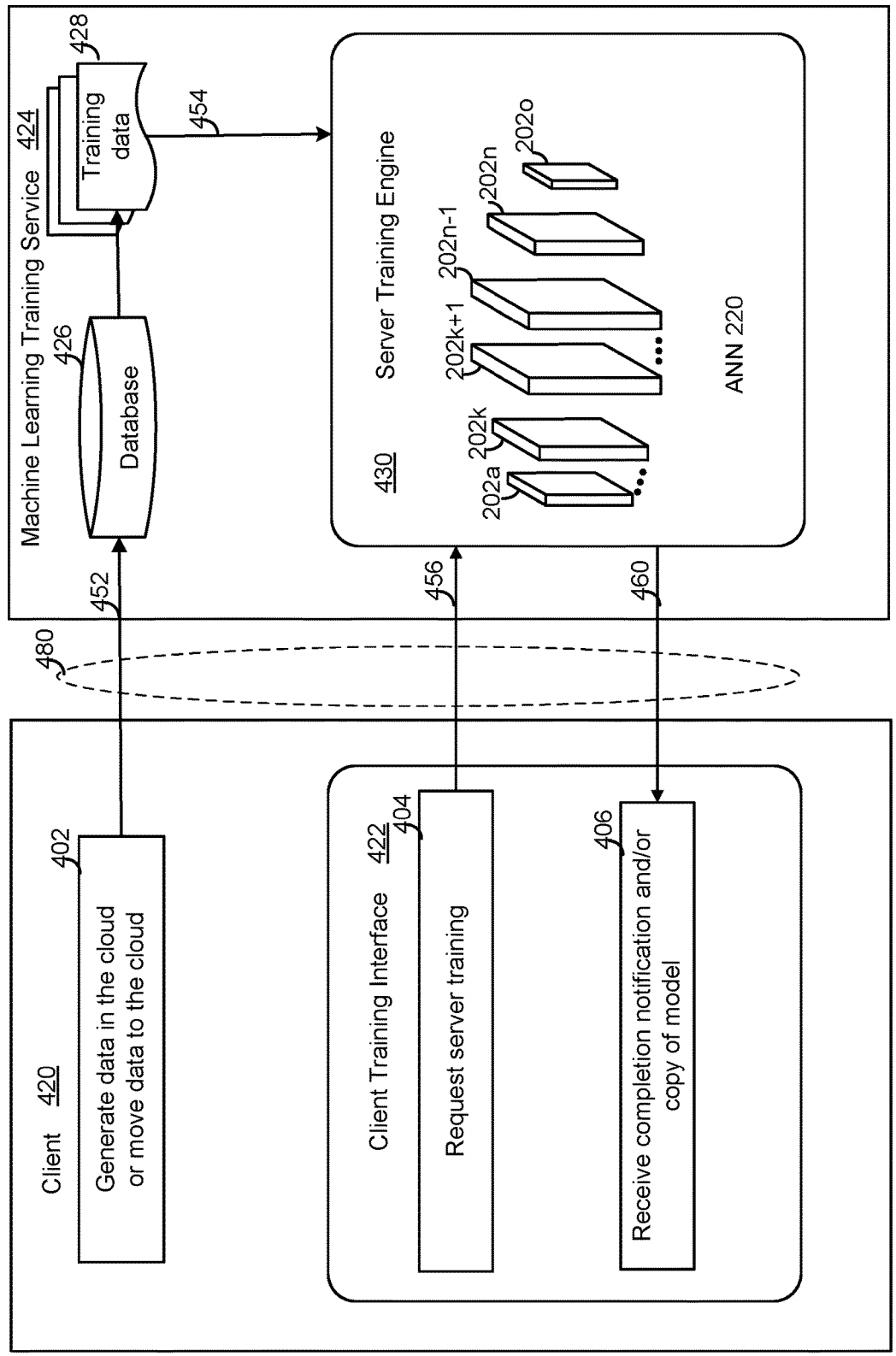
FIG. 4A depicts a client-machine training service, according to the prior art.

FIG. 4A depicts a client-machine training service, according to the prior art. The client 420 includes a client training interface 422. The machine learning training service 424 includes a database 426 for storing user data, training data 428 derived from the data in the database 426 and a server training engine 430, which contains ANN 220, having layers 202a, 202k, 202k+1, 202n−1, 202n and 202o. Client 420 and machine learning training service 424 use a communications link 480, such as the Internet, to send and receive requests and data. Operation of the training service is described in reference to FIGS. 4B and 4C.

Figure 4B:
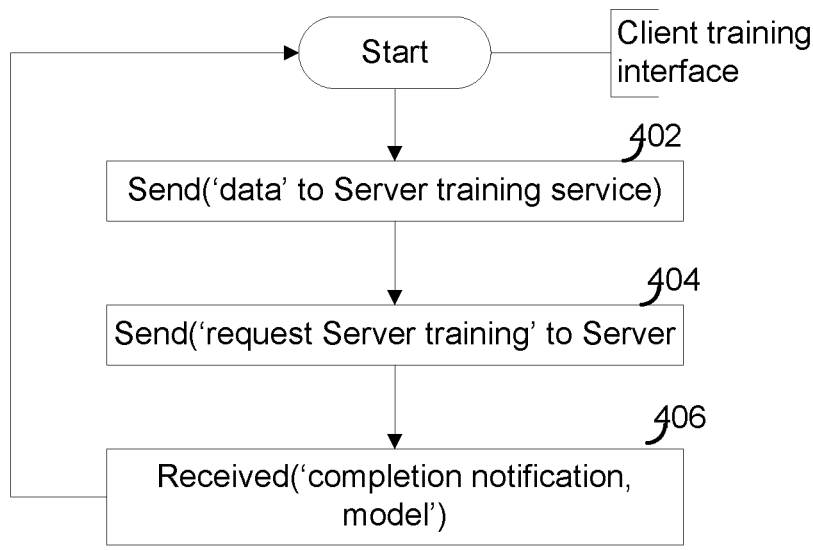
FIG. 4B depicts a flowchart of the operations of a client training interface, according to the prior art.

FIG. 4B depicts a flowchart of the operations of a client training interface, according to the prior art. In step 402, client training interface 422 sends 'data' to a machine learning training service 424. In step 404, client training interface 422 sends a 'request' to server training engine 430 to start the training. In step 406, client training interface 422 receives notice of completion from server training engine 430 and model ANN 220 that was trained.

Figure 4C:
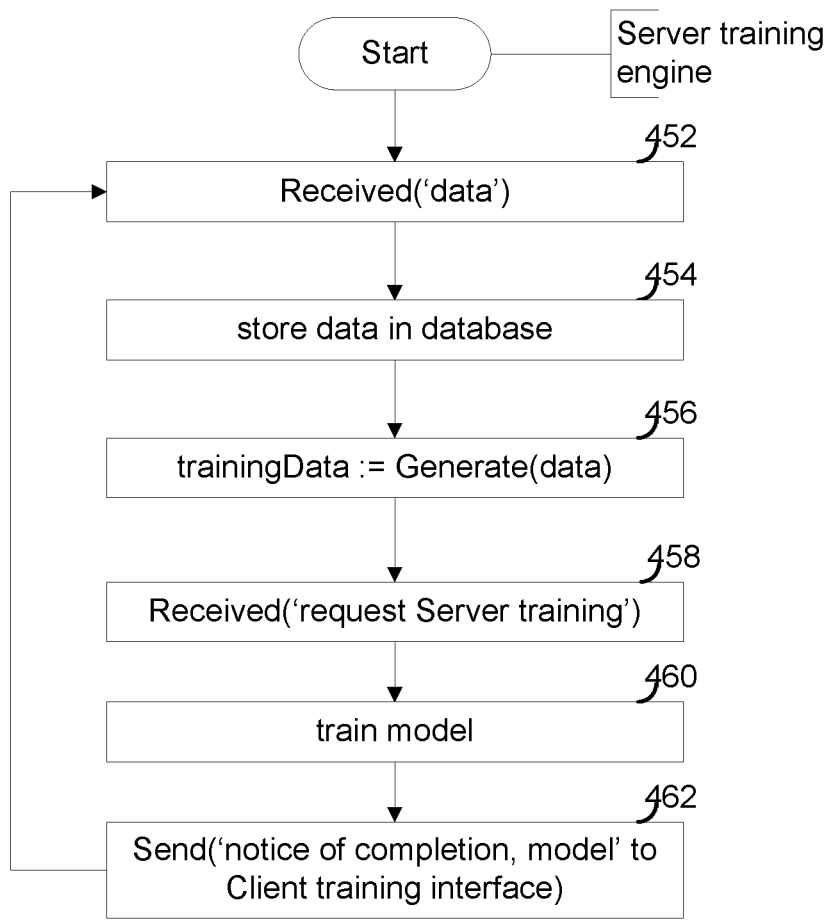
FIG. 4C depicts a flowchart of the operations of a server training engine, according to the prior art.

FIG. 4C depicts a flowchart of the operations of a server training engine, according to the prior art. In step 452, machine learning training service 424 receives the 'data' sent by client training interface 422. In step 454, machine learning training service 424 stores the received data in database 426. In step 456, machine learning training service 424 generates training data 428 based on the received data. In step 458, server training engine 430 receives a 'request-ServerTraining' message to requesting that server training engine 430 perform the training from client training interface 422. In step 460, server training engine 430 trains ANN 220 and in step 462 sends a 'notice of completion' to client training interface 422.

Thus, in FIGS. 4A, 4B and 4C training is performed entirely by server training engine 430. However, vulnerabilities ensue when the machine learning training service 424 resides in a cloud, where, hereinafter, a cloud refers to a private or publically available pool of system resources, such as storage, processors and software, which are available on demand as a service to the user via a communications link, such as communications link 480. A well-known public cloud is the Amazon Web Services (AWS). If machine learning training service 424 resides in a cloud, then training data 428 and possibly even the entire data infrastructure must be moved to the cloud. Client training interface 422 sends the training request to machine learning training service 424 and optionally receives a copy of the trained model. In this arrangement, machine learning training service 424, residing in the cloud, has full access to client input data 328.

In both the inference service depicted in FIG. 3A and the training service depicted in FIG. 4A, the sending data from client 320, 420 to a server service 324, 424 in the cloud creates a potential for a data breach if server service 324, 424 does not have protections in place for user data. Even if the data sent from client 320, 420 to server service 324, 424, is encrypted, the data can be decrypted if an attacker has the proper decryption keys and tools. Moreover, performance of the inference or training services is entirely dependent on the performance of the server on which the inference or training is performed.

Figure 5:
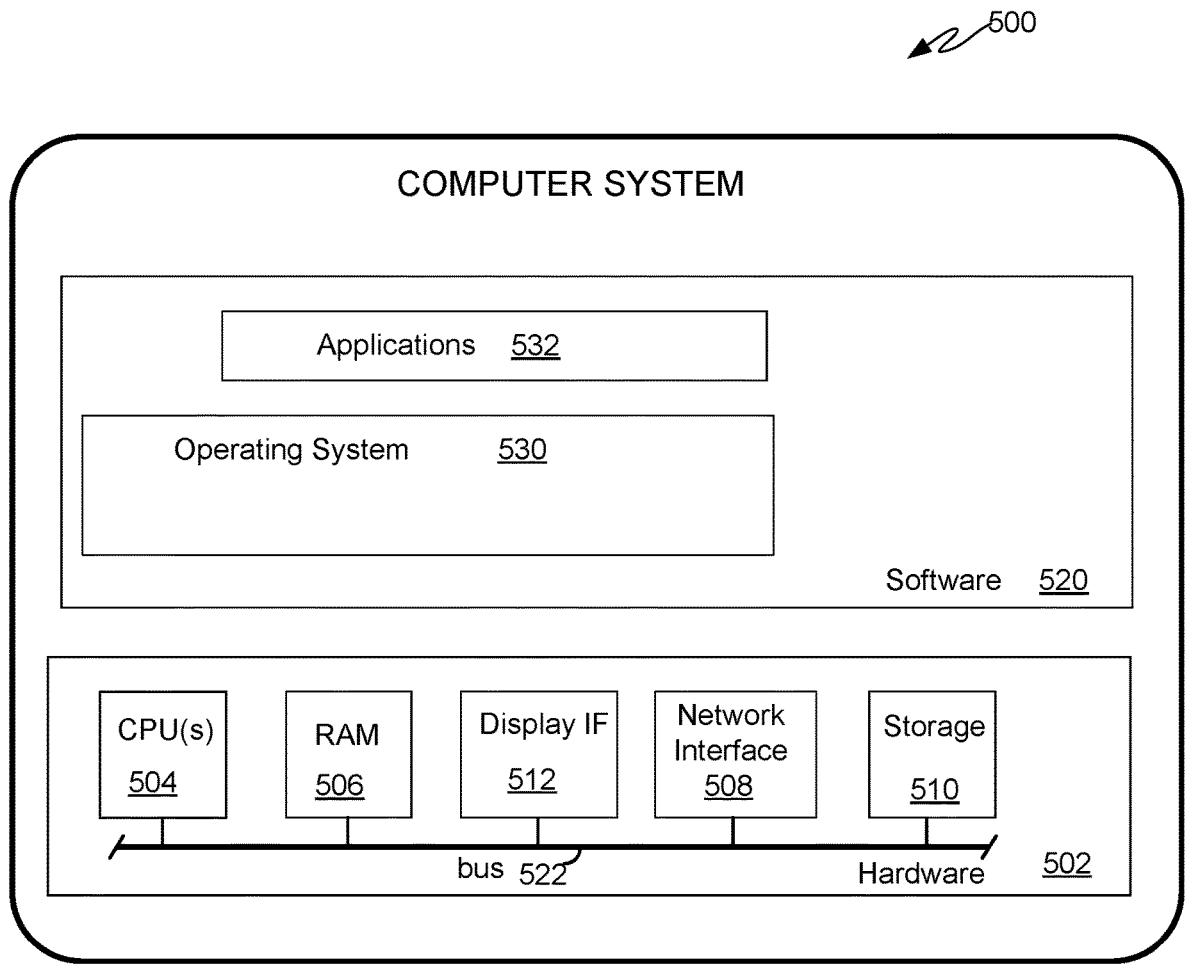
FIG. 5 depicts a block diagram of a computing system in which embodiments may operate.

FIG. 5 depicts a block diagram of a computing system in which embodiments may operate. As shown, computer system 500 includes hardware 502 and software 520. Hardware 502 includes one or more CPUs 504 configured to execute instructions stored in RAM 506. Hardware 502 further includes a display interface (IF) 512 configured to output a user interface or data to a display device, such as under the direction of one or more CPUs 504. Hardware 502 further includes a network interface (e.g., a physical network interface card (PNIC)) 508 configured to allow computer system 500 to communicate over a network (e.g., the Internet, local area network, cloud network, etc.). For example, a computer system 500 acting as a client, as discussed herein, may communicate with another computer system 500 acting as a server (e.g., in a cloud), as discussed herein. Hardware 502 further includes storage 510 configured to store data, such as software 520. As shown, the components of hardware 502 are interconnected by bus 522. Software 520 comprises programs, such as operating system 530 and applications 532, the instructions for which are stored in RANI 506 and executed by one or more CPUs 504.

Figure 6A:
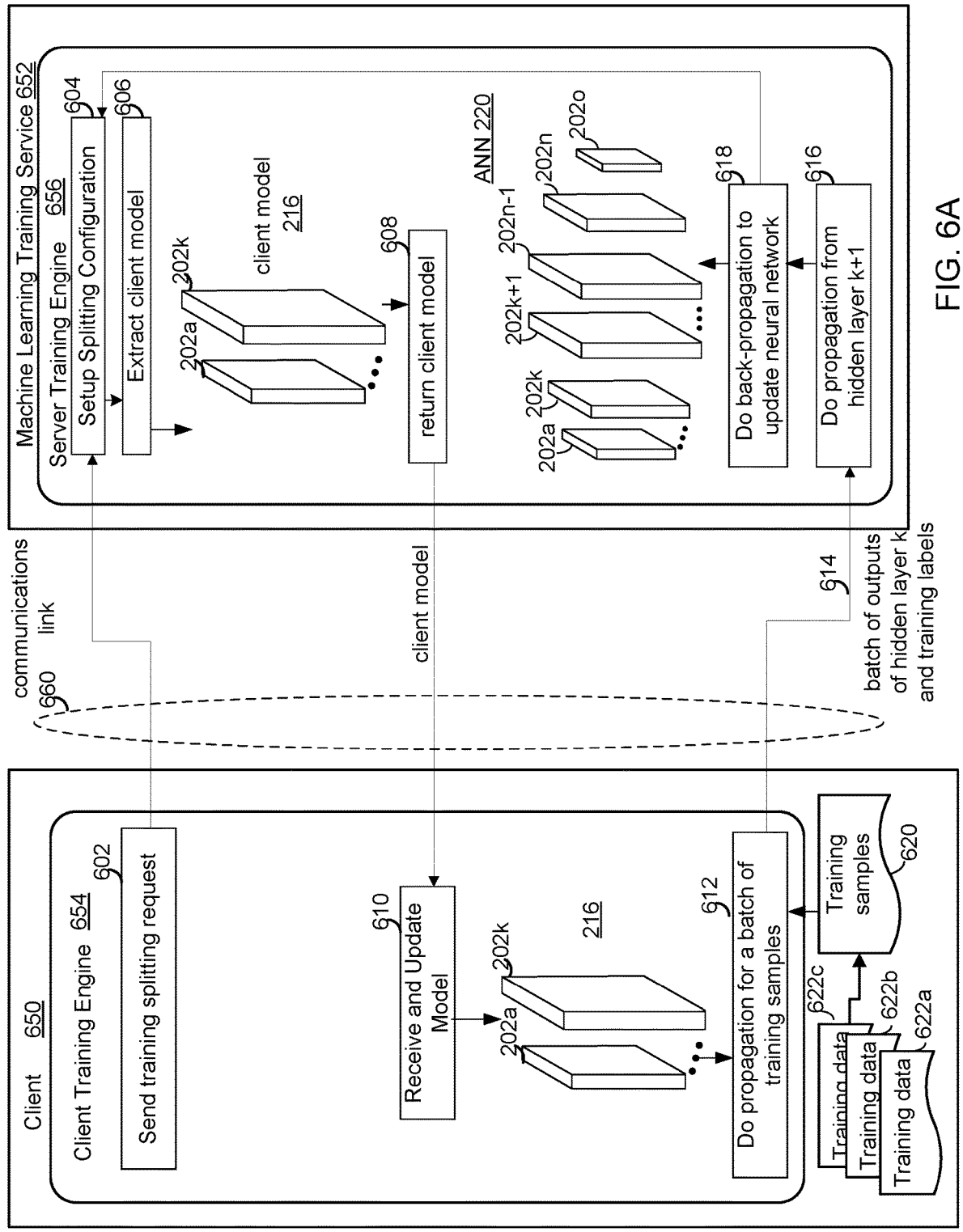
FIG. 6A depicts a client and a machine learning training service, in an embodiment.

FIG. 6A depicts a block diagram of a client and machine learning training service, in an embodiment. Client 650 includes a client training engine 654 and training data 622a-c, training samples 620. Machine learning training service 652 includes a server training engine 656 and ANN 220. Client 650 and machine learning training service 652 use a communications link 660 to send and receive requests and data. In an embodiment, client 650 and machine learning training service 652 are computer systems such as that depicted in FIG. 5 and client training engine 654 and server training engine are applications 532 in computer system 500 of FIG. 5.

In the arrangement of FIG. 6A, client training engine 654 communicates with server training engine 656 requesting that ANN 220 be split into two portions, a CM 216 and a SM 218. Thus, there are now two training engines, with each training engine 654 and 656 performing training on its respective model. In the arrangement of FIG. 6A, training data 622a-c and training samples 620 are never communicated to server training engine 656; only intermediate values 614 are sent from client training engine 654 to server training engine 656. Since original training data 622a-c and training samples 620 cannot easily be discovered from intermediate values 614 sent between client training engine 654 and server training engine 656 original training data 622a-c and training samples 620 are kept private, and an observer of the traffic over communications link 660 has great difficulty in inserting foreign training data into the training operations.

Figure 6B:
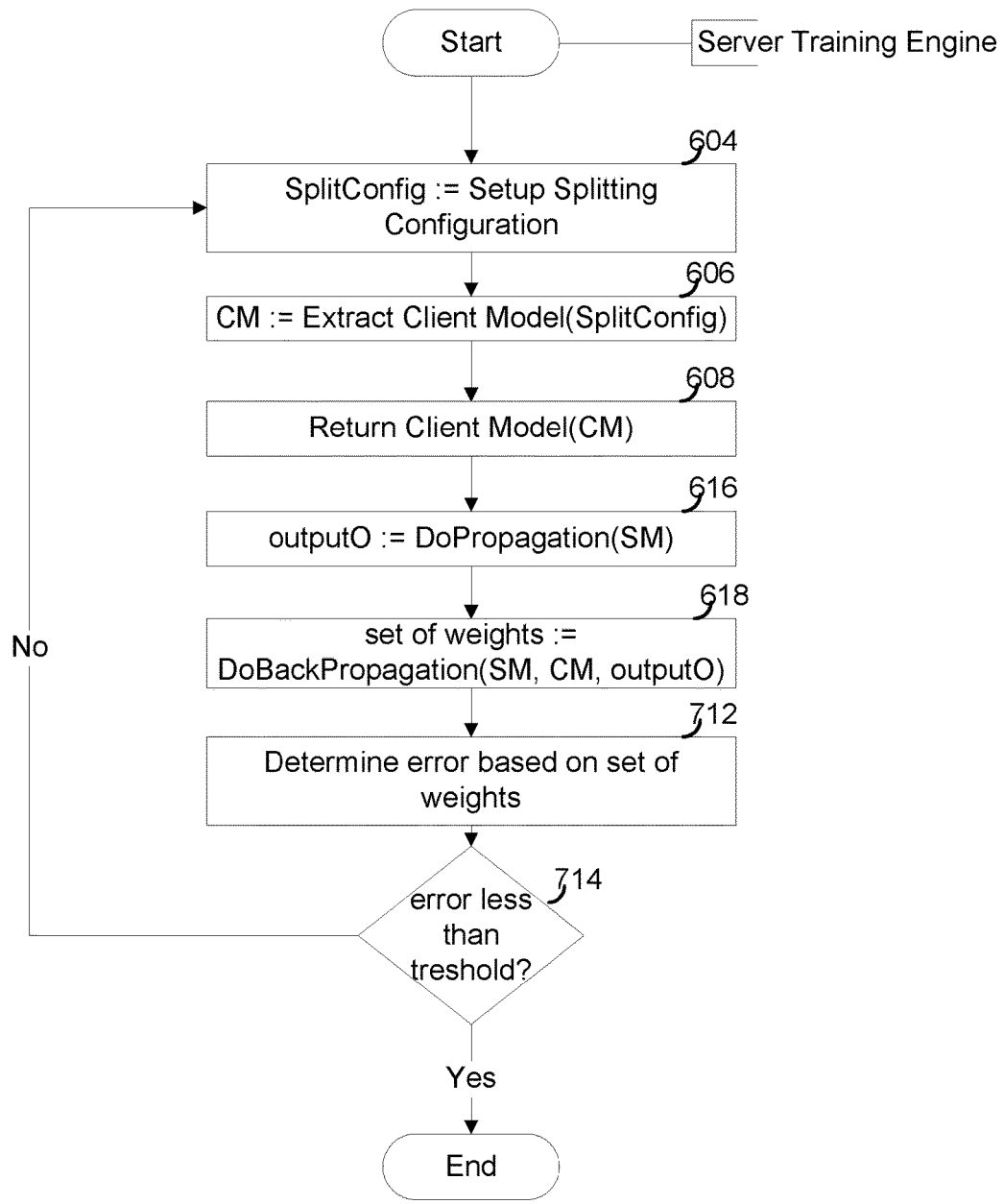
FIG. 6B depicts a flowchart of the operations of a server training engine, in an embodiment.
Figure 6C:
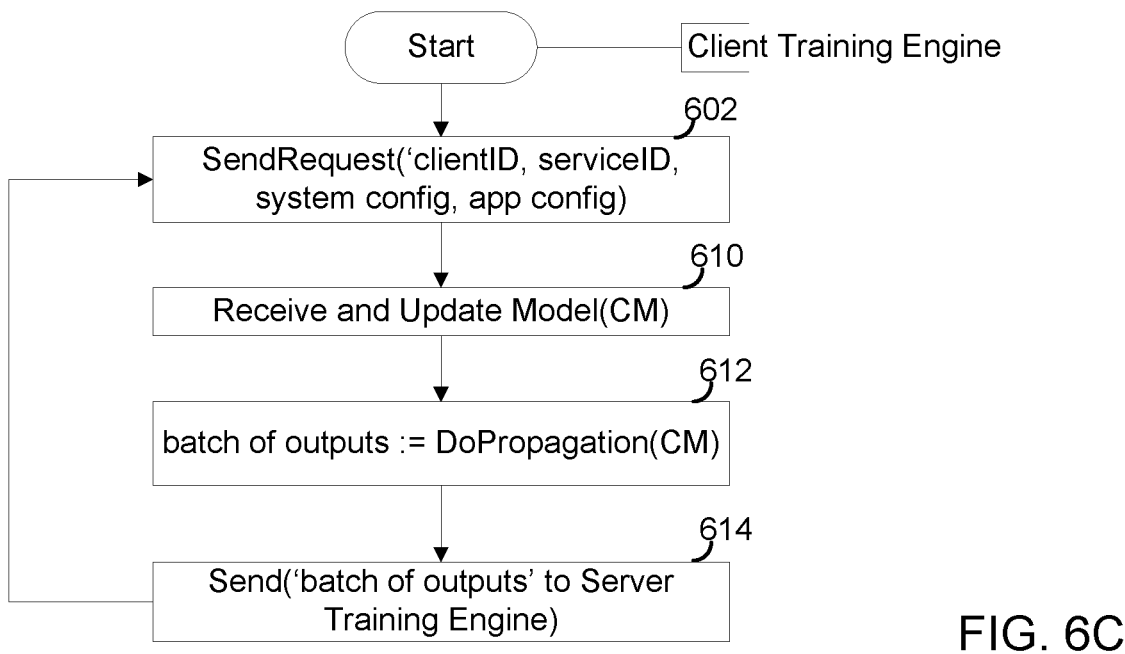
FIG. 6C depicts a flowchart of the operations of the client training engine, in an embodiment.

Operations in FIG. 6A are described in reference to FIGS. 6B and 6C.

FIG. 6B depicts a flowchart of the operations of a server training engine, in an embodiment. In step 604, server training engine 656 performs a Setup Splitting Configuration function to generate a split configuration, called 'SplitConfig'. In step 606, server training engine 656 extracts CM 216 based on 'SplitConfig', leaving the one or more subsequent layers of model SM 218 with server training engine 656. In step 608, server training engine 656 returns CM 216 to client 650. In step 616, server training engine 656 performs a DoPropagation function on SM 218 portion of the model. In step 618, server training engine 656 performs a DoBackPropagation function based on SM 218, on CM 216 (optionally), and on 'outputO', which is the output of the last layer of ANN 220 (and SM 218). In step 712, server training engine 656 determines an error between the output of ANN 220 and the target output (which was provided in the training samples) using the set of weights returns by the DoBackPropagation function in step 618. If the error is not less than a threshold, as determined in step 714, then server training engine 656 returns back to step 604 to redo the training. If the error is less than the threshold, then the training is completed, i.e., a set of weights for ANN 220 has been found that causes the output of ANN 220 to have a sufficiently low error for each input in training samples 620.

FIG. 6C depicts a flowchart of the operations of the client training engine, in an embodiment. In step 602 of FIG. 6C, client training engine 654 sends a request containing a client ID, a service ID, a system configuration, and an application configuration to server training engine 656. In step 610, client training engine 654 receives and updates CM 216 with CM 216 sent to it by server training engine 656. In step 612, client training engine 654 performs a DoPropagation function on CM 216 which results in a 'batch of outputs'. The DoPropagationForBatch function is further described in reference to FIG. 8B. In step 614, client training engine 654 sends the 'batch of outputs' to server training engine 656.

FIGS. 7A-7E set out in more detail the various functions of server training engine 656, in an embodiment.

Figure 7A:
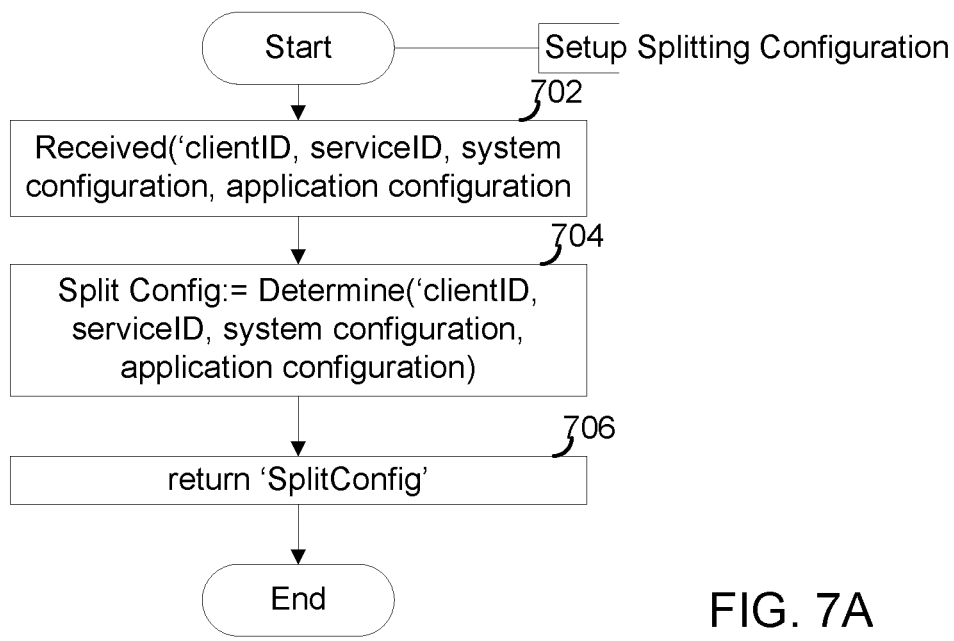
FIG. 7A depicts a flowchart of the operations of Setup Splitting Configuration function, in an embodiment.

FIG. 7A depicts a flowchart of the operations of the Setup Splitting Configuration function of step 604 in FIG. 6B, in an embodiment. In step 702, the function receives the client ID, the service ID, the system configuration, and the application configuration. In step 704, the function determines the split configuration based on the client ID, the service ID, the system configuration, and the application configuration. In step 706, the function returns the split configuration, 'SplitConfig'.

Figure 7B:
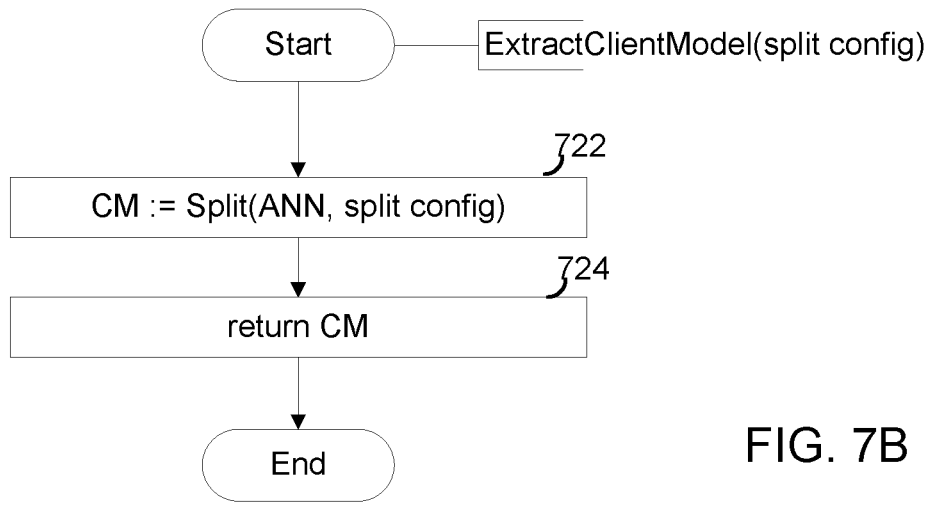
FIG. 7B depicts a flowchart of the operations Extract Client model function, in an embodiment.

FIG. 7B depicts a flowchart of the operations of the Extract Client Model function, in an embodiment. In step 722, the function performs a split of ANN 220 based on 'SplitConfig' output of step 604 in FIG. 6B. In step 724, the function returns CM 216.

Determining the layer k at which the split of ANN 220 occurs depends on several factors including the security and privacy desired for the end user, load balancing client 650 and machine learning training service 652, protecting trained models of machine learning training service 652 while off-loading the training to client 650 and optimizing performance of the machine learning application based on throughput and network bandwidth over communications link 660. In one embodiment, a random choice of the layer at which the split occurs is performed. In another embodiment, a different split can occur for different training data. In certain embodiments, the selection of the $k^{th}$ layer for the split meets one of two or both of the following requirements: (1) the kth layer includes a one-way activation function like a max pooling function in a max pooling layer of a convolutional neural network (CNN) or a rectifier in a Rectified Linear Unit (ReLU); and (2) the number of nodes in the kth layer is less than the number of nodes in any other layers of the first portion.

Figure 7C:
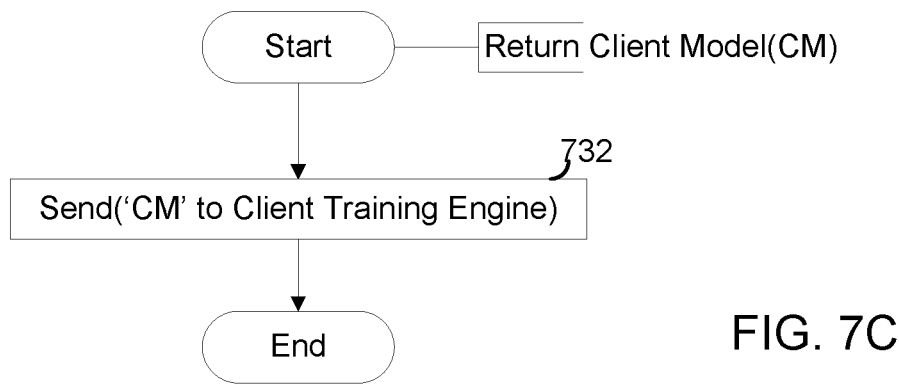
FIG. 7C depicts a flowchart of the operations of the Return Client Model function sending encrypted data to the client, in an embodiment.

FIG. 7C depicts a flowchart of the operations of the Return Client Model function, in an embodiment. In step 732, the function sends a message containing CM 216 to client training engine 654.

Figure 7D:
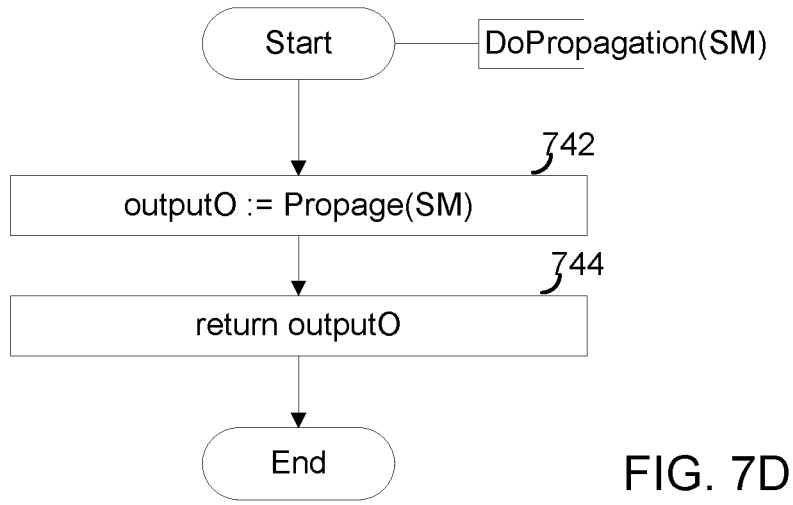
FIG. 7D depicts a flowchart of operations of the DoPropagation function, in an embodiment.

FIG. 7D depicts a flowchart of the operations of the DoPropagation function, in an embodiment. In step 742, the function performs a Propagate function on SM 218, which, in one embodiment, is similar to the forward propagation in step 258 of FIG. 2B. In step 744, the function returns the output, 'outputO', of SM 218, which is the output from last layer 220o in ANN 220.

Figure 7E:
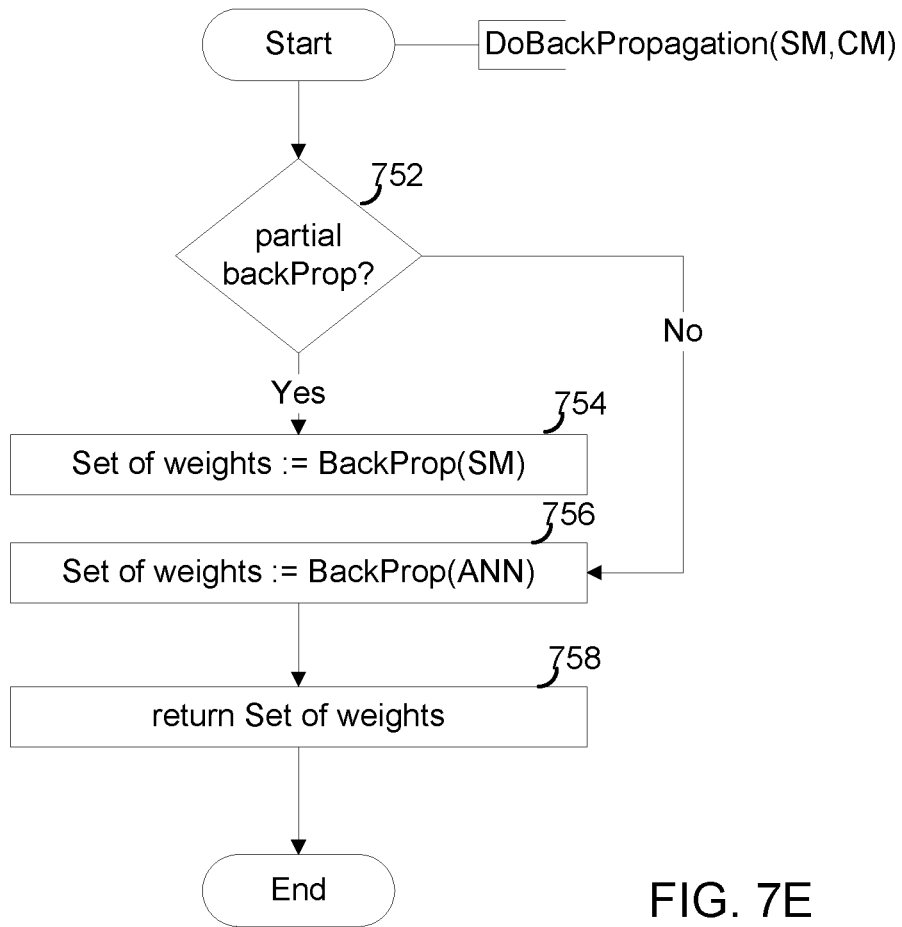
FIG. 7E depicts a flowchart of the operations of the DoBackPropagation function, in an embodiment.

FIG. 7E depicts a flowchart of the operations of the DoBackPropagation function, in an embodiment. In step 752, the function determines whether or not the function should perform a complete or partial back propagation. If, as determined in step 752, a partial back prop is to be performed, then in step 754, the function performs a BackProp function on SM 218 portion of ANN 220. Otherwise, the function performs in step 756 a BackProp function on ANN 220. In step 758, the function returns the set of weights determined based on the Propagate and BackProp functions. In an embodiment, the BackProp function is similar to the one performed in step 262 of FIG. 2B.

Figure 8A:
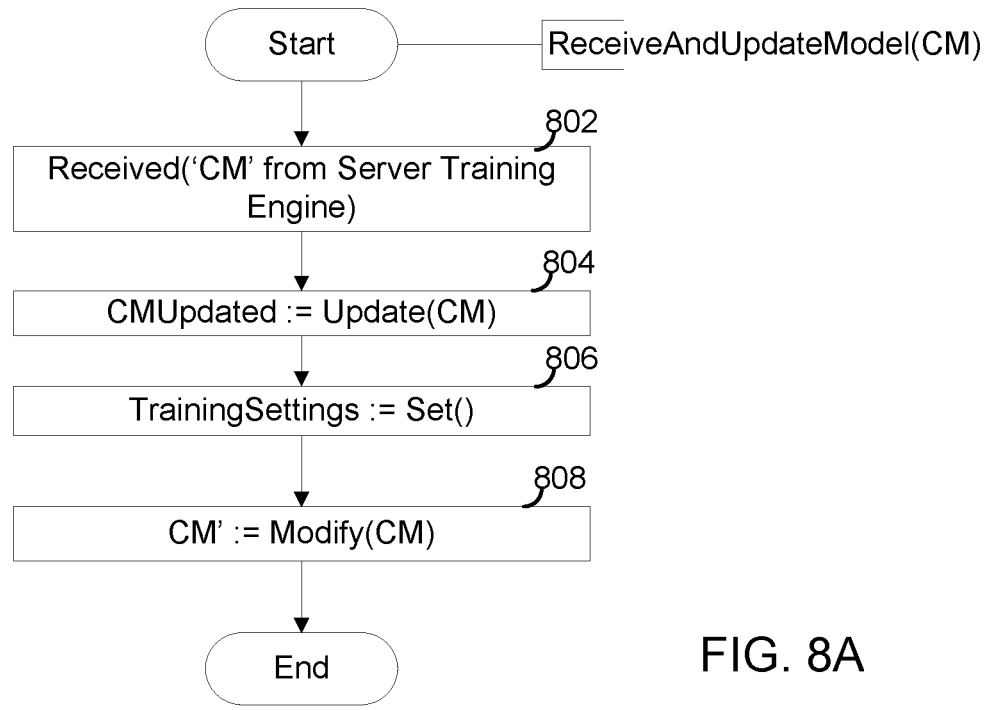
FIG. 8A depicts a flowchart of the operations of the ReceiveAndUpdate model function, in an embodiment.
Figure 8B:
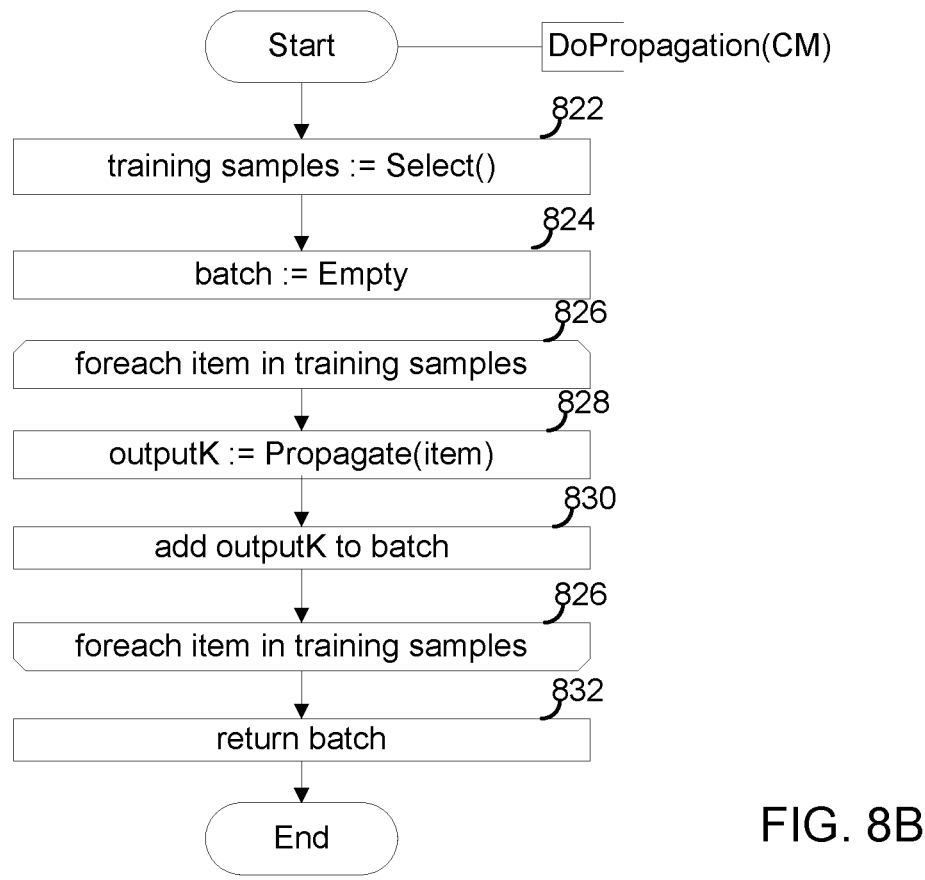
FIG. 8B depicts a flowchart of the operations of the DoPropagationForBatch function, in an embodiment.

FIGS. 8A and 8B set out in more detail the functions of the client training engine 654.

FIG. 8A depicts a flowchart of the operations of the ReceiveAndUpdateModel function, in an embodiment. In step 802, the function receives CM 216 from server training engine 656. In step 804, the function updates CM 216 from received CM 216. In step 806, the function sets the training settings for CM 216. In step 808, the function optionally modifies CM 216 to CM' by slightly changing its weights. Modifying CM 216 improves the security of the intermediate values sent to server training engine 656 by making it much less likely to infer the training data from the intermediate values.

FIG. 8B depicts a flowchart of the operations of the DoPropagation function of the client training engine, in an embodiment. In step 822, the function selects training samples 620 derived from training data 622a-c. In step 824, the function initializes a batch variable to empty. In step 826, the function starts an iterator over each item in training samples 620. For each item in the training samples 620, the function forward propagates, in step 828, the sample as an input into CM 216 (or the modified model CM') and in step 830 records the output 'outputK' from CM 216 or CM', which is the output of the last layer of CM 216 or CM' and adds 'outputK' to the batch. In step 832, the function returns the batch of outputs and training labels, which are used in step 612 of FIG. 6C. Training labels indicate information regarding the training samples and/or output. For example, training labels could include 'good' or 'bad' for indicating whether the training samples and/or output is good or bad. In another example, training labels could include 'cat' or 'dog' for indicating training samples and/or output is an image of a cat or dog. It should be noted that certain embodiments do not include the DoPropagation function of the client training engine as the DoBackPropagation of the server (described with respect to FIG. 7E), can update the weights of both the client and server models before the updated client model CM' is sent back to the client.

Figure 9A:
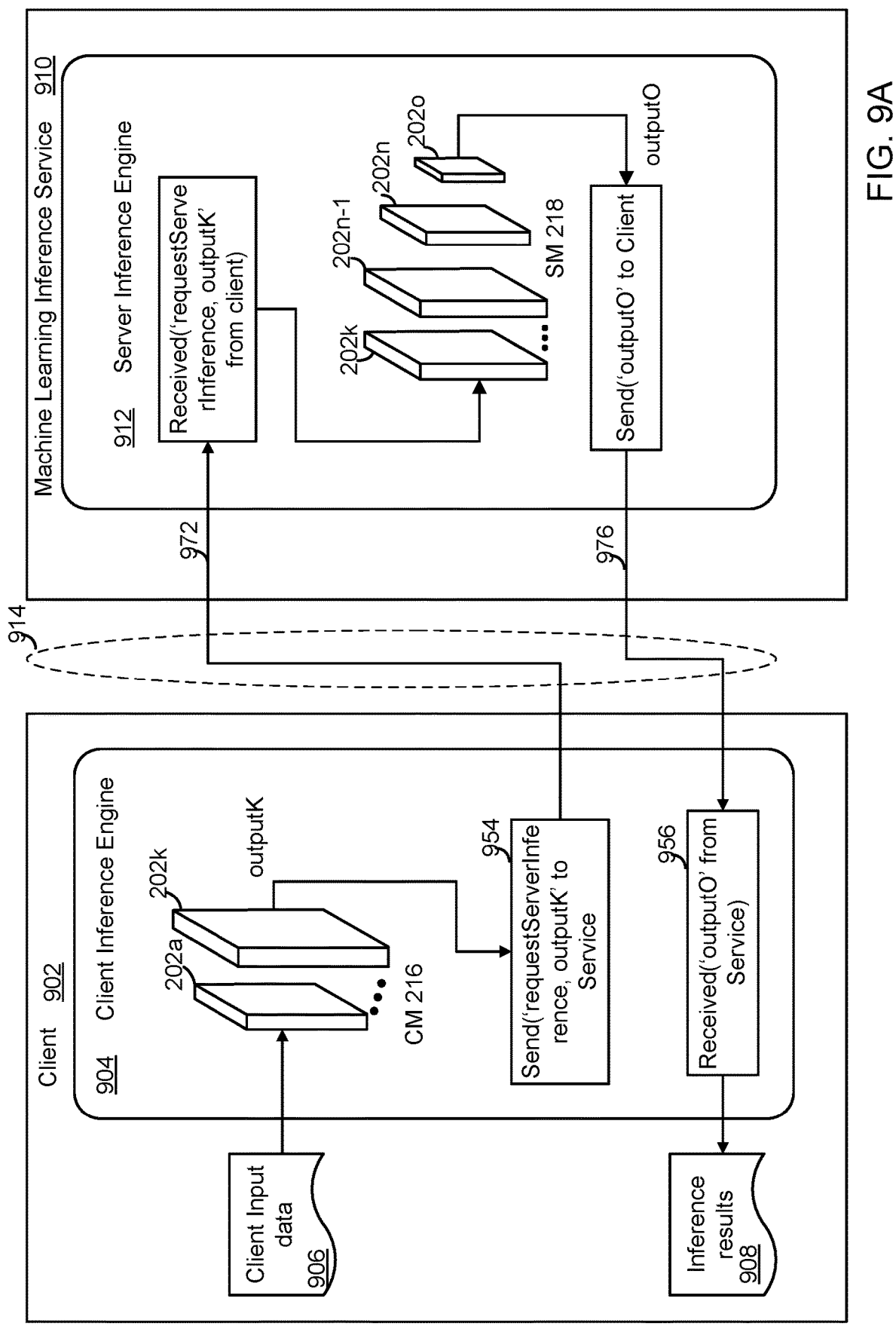
FIG. 9A depicts a block diagram depicting client and server inference engines, in an embodiment.

FIG. 9A depicts a block diagram depicting client and server inference engines, in an embodiment. The figure includes a client 902 with a client inference engine 904 and a machine learning inference service 910 with a server inference engine 912. The client inference engine 904 includes CM 216 and server inference engine 912 includes SM 218. The client inference engine 904 receives client input data 906, performs an inference on CM 216 and sends the output, outputK, to the server inference engine 912. The server inference engine uses outputK to perform an inference on SM 218 and sends the results, outputO, to the client inference engine which reports the inference results 908 to the user. The details of the client inference function performed by the client inference engine are described in reference to FIG. 9B and the details of the server inference function performed by the server inference engine are described in reference to FIG. 9C.

Figure 9B:
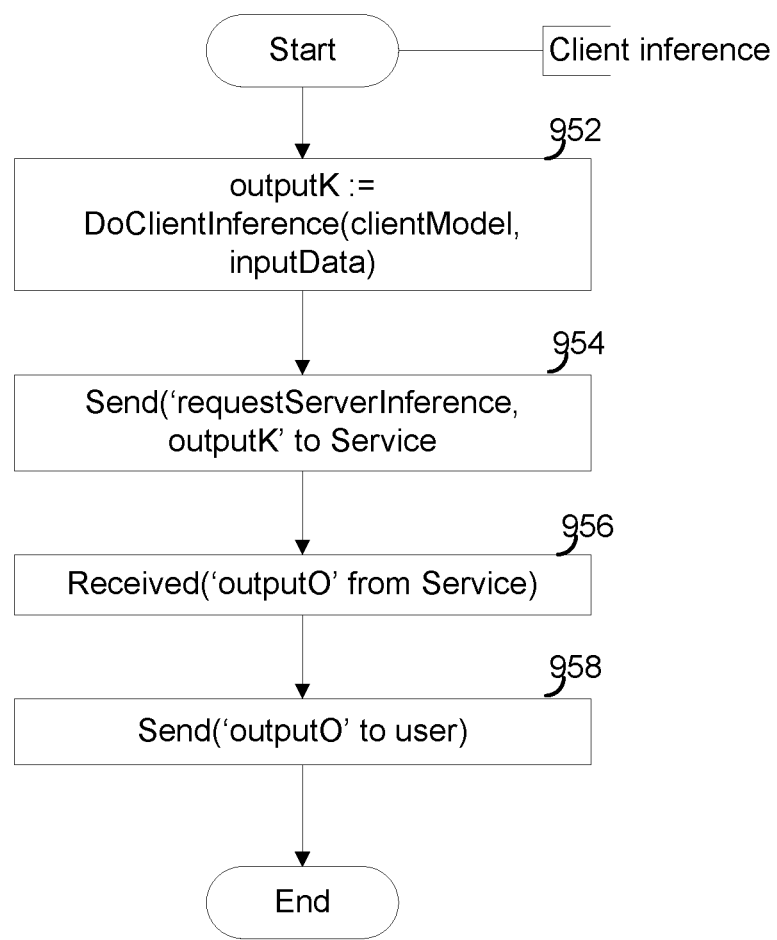
FIG. 9B depicts a flowchart of the operations of a client inference function, in an embodiment.

FIG. 9B depicts a flowchart of the operations of a client inference function, in an embodiment. In step 952, the client inference function performs an inference on the CM 216 using client input data 906. In step 954, the client inference function sends a 'requestServerInference' message requesting that the server inference engine 912 to perform a server inference function, where the message also includes the output, 'outputK' of the client inference function. In the embodiment, the client inference is a forward propagation of the inputs through CM 216 to the output. In step 956, the client inference function receives the output, 'outputO', of the full network from the server inference function. In step 958, the client inference function sends the 'outputO' data to the user as inference results 908.

Figure 9C:
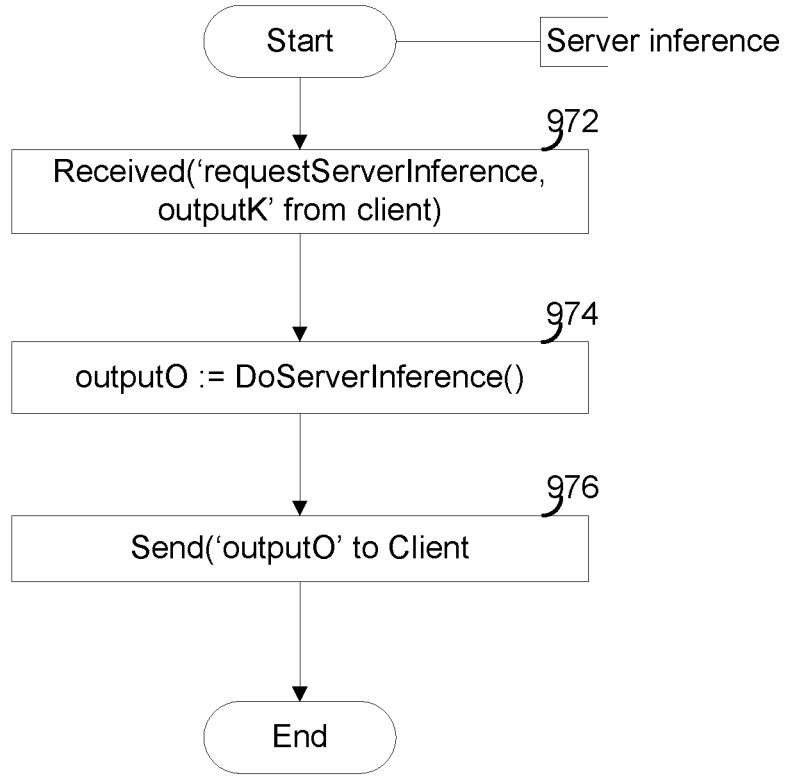
FIG. 9C depicts a flowchart of the operations of a server inference function, in an embodiment.

FIG. 9C depicts a flowchart of the operations of a server inference function, in an embodiment. In step 972, the server inference function receives a 'requestServerInference' message and the 'outputK' values from the client inference engine 904 and in step 974 performs a server inference using the outputK values. In the embodiment, the server inference is a forward propagation of the 'outputK' values through the SM 218. In step 976, the server inference engine 912 sends the 'outputO' to the client.

To further improve the privacy of sending the intermediate values in step 614 of FIG. 6C and step 954 in step 9B, the intermediate values, i.e., the batch of outputs, can be encrypted. A suitable encryption scheme in one embodiment is described in reference to FIGS. 10A and 10B.

Figure 10A:
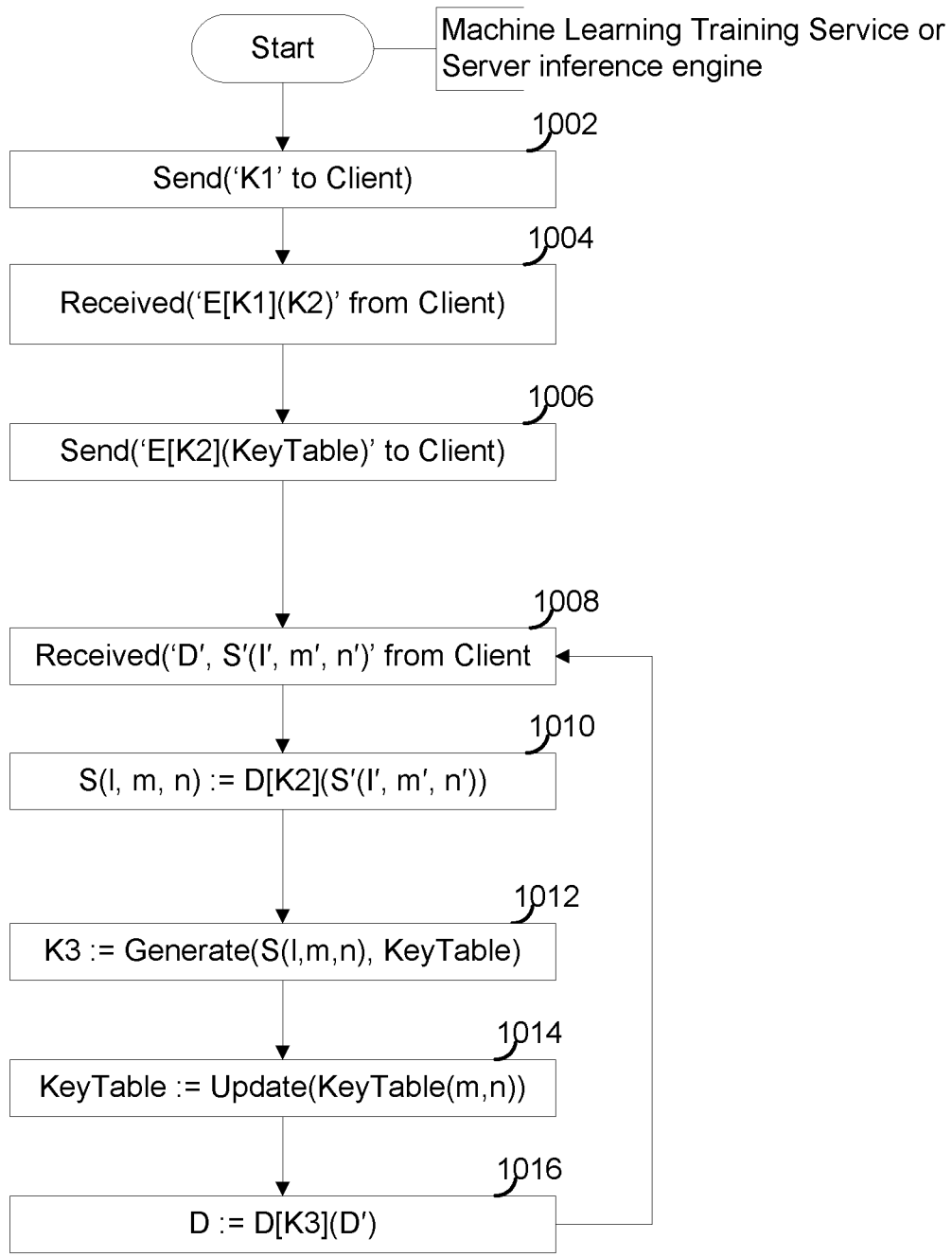
FIG. 10A depicts a flowchart of the operations of the server process receiving encrypted data to the client, in an embodiment.

FIG. 10A depicts a flowchart of the operations of server receiving encrypted data from the client, in an embodiment. Client 650 and server training service 652 communicate data between each other over a communications link 660. Similarly, client inference engine 904 and server inference engine 912 communicate data over a communications link 914. In the discussion below, the client 650, 902 is either client 650 or client 902 and the server 652, 912 is either server training service 652 or server inference engine 912. The data communicated is encrypted according to the operations depicted in FIG. 9A. In step 1002, the server 652, 912 sends a public key, K1, to the client, where encryption of an item with key K is denoted as E[K](item). In step 1004, the server 652, 912 receives a shared key K2 which is encrypted with K1 from client 650, 902. In step 1006, the server 652, 912 sends a key table, encrypted with key K2, to the client. After step 1006, the server 652, 912 is set up to receive encrypted data from the client 650, 902 using a key K3 derived from the key table. In step 1008, the server 652, 912 receives encrypted data D' and encrypted seed S' from the client 650, 902. In step 1010, the server 652, 912 decrypts the encrypted seed S' using key K2 to recover the seed S(l, m, n), where decryption of an item with K is denoted as D[K](item). In the seed S, integer l indicates an index of the byte in the key table that is used as the start point of the key generation process and is randomized within a range of values that ensure the size of the generated K3 to be equal to or larger than the size of D. The integer m indicates the ID of the key table update method and is randomized among the available key table update method and the integer n is a random seed that is used as a parameter of the key table update method. In step 1012, the server 652, 912 generates the key K3 using the recovered seed S and the key table. In step 1014, the server 652, 912 updates the key table using the m and n integers. In step 1016, the server 652, 912 then decrypts the data D' using key K3 to recover the data D.

Figure 10B:
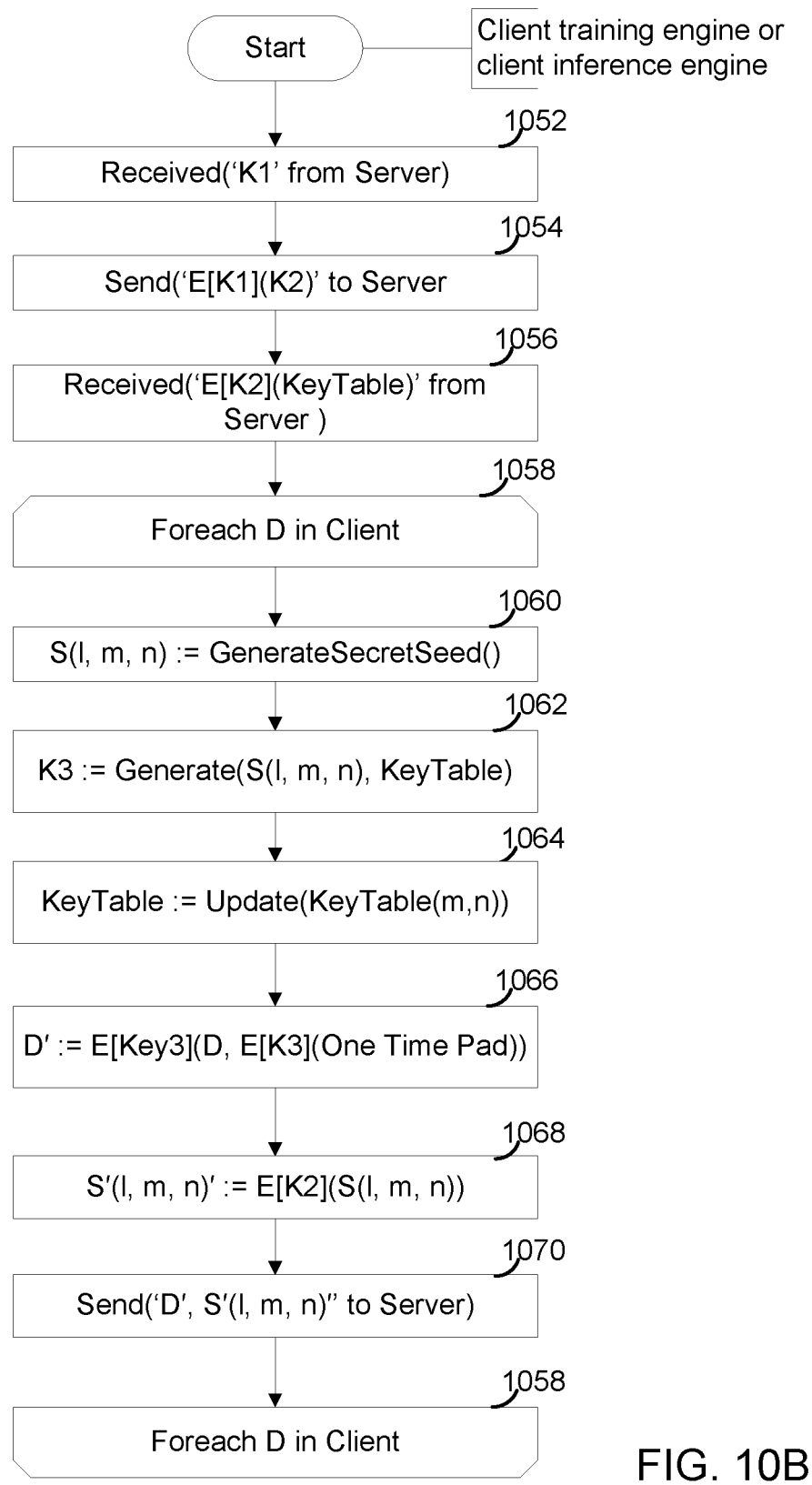
FIG. 10B depicts a flowchart of the operations of the client sending encrypted data, in an embodiment.

FIG. 10B depicts a flowchart of the operations of the client sending encrypted data, in an embodiment. In step 1052, client 650, 902 receives a public key K1 from server 652, 912. In step 1054, client 650, 902 sends a shared key K2 encrypted with K1 to server 652, 912. In step 1056, client 650, 902 receives a key table encrypted with K2 from server 652, 912. At this point, client 650, 902 is ready to encrypt data to send to server 652, 912. In step 1058, client 650, 902 sets up an iterator that includes steps 1060, 1062, 1064, 1066, 1068 and 1070 to process each data item D to be sent to server 652, 912. In step 1060, client 650, 902 generates a secret seed S(l, m, n), where l, m, and n are integers that parameterize the seed as described above. In step 1062, client 650, 902 generates key K3 from the key table and the secret seed S. In step 1064, the client 650, 902 updates the key table using the m and n parameters. In step 1066, client 650, 902 encrypts the data with K3 and encrypts a one-time pad with K3. In step 1066, client 650, 902 encrypts the secret seed S(l, m, n) with K2. In step 1068, client 650, 902 sends the encrypted data D' and the encrypted seed S'(l, m, n) to server 652, 912.

In certain embodiments, it is desirable to add a layer of security beyond just the secrecy provided by encrypting the intermediate values being sent between the client 650, 902 and the server 652, 912. Example security protocols for providing this layer of security are described in reference to FIGS. 11 and 12. It should be noted that other security protocols may instead be used.

Figure 11:
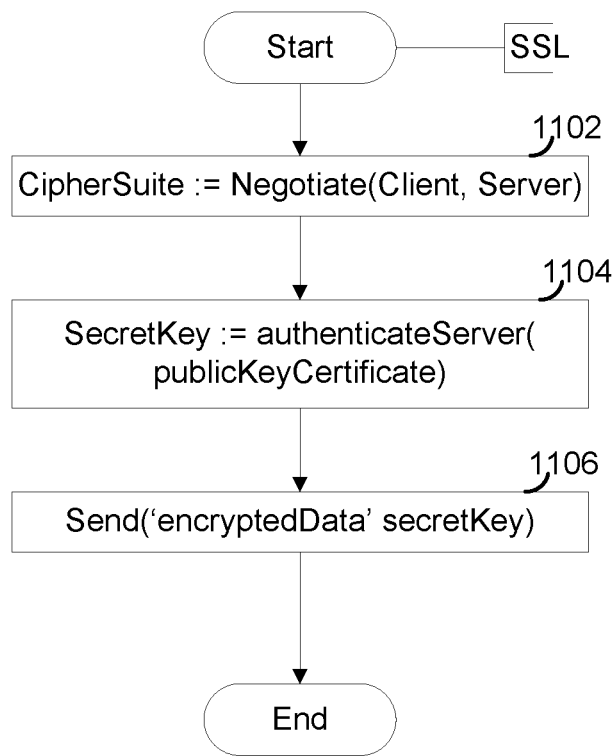
FIG. 11 depicts a flowchart of the operations of the use of the secure socket layer (SSL) protocol to provide security to the encrypted data, in an embodiment.

FIG. 11 depicts a flowchart of the operations of the use of the secure socket layer (SSL) protocol to provide security to the encrypted data, in an embodiment. In step 1102, client 650, 902 and server 652, 912 negotiate a cipher suite to be used in communication. In step 1104, an authentication process authenticates server 652, 912 and establishes a new secret key for a session between client 650, 902 and server 652, 912. In step 1106, client 650, 902 and server 652, 912 send and receive encrypted data that is now encrypted with the new secret key for the session.

Figure 12:
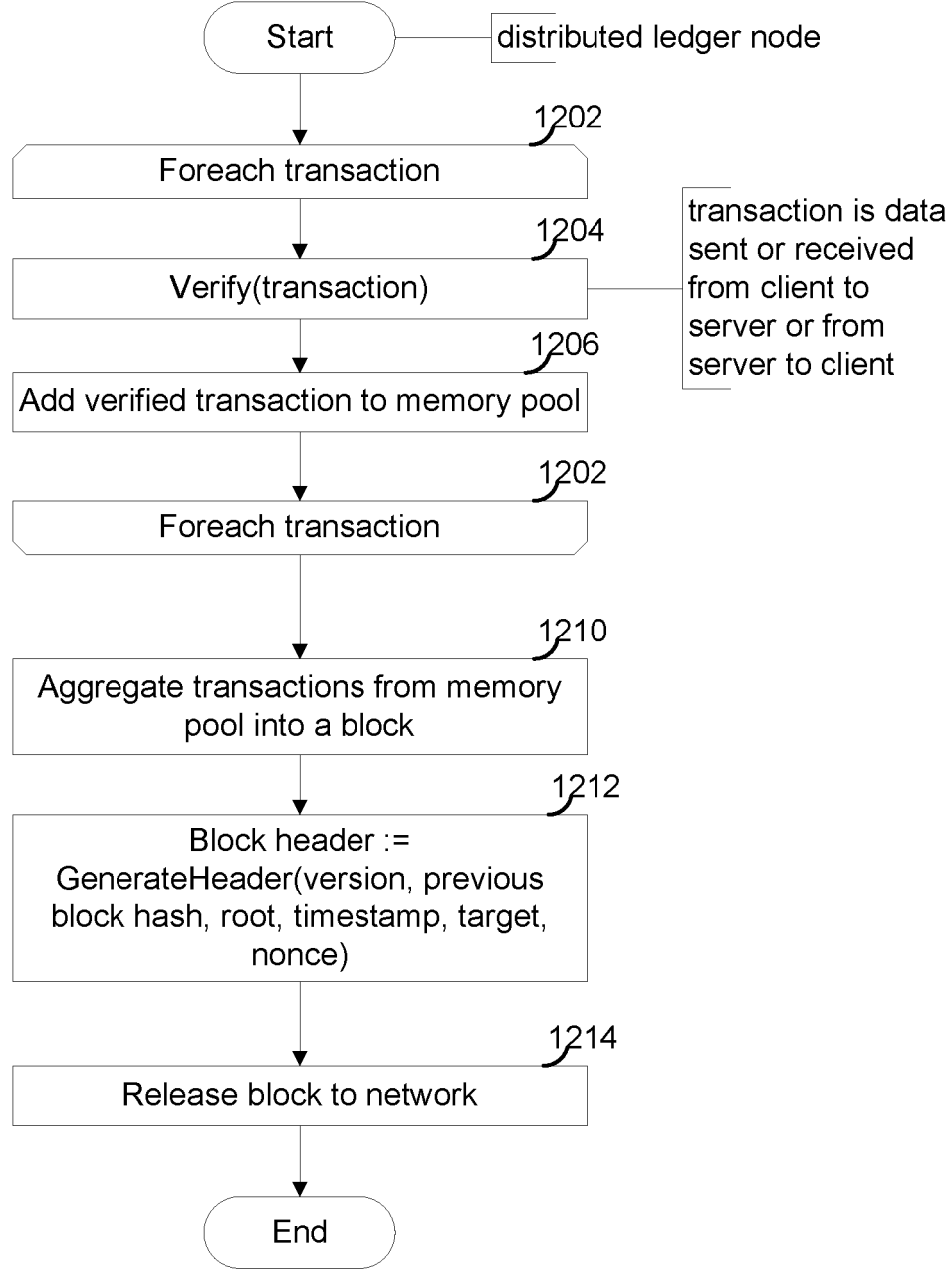
FIG. 12 depicts a flowchart of the operations of the use of a distributed ledger to provide security to the encrypted data, in an embodiment.

FIG. 12 depicts a flowchart of the operations of the use of a distributed ledger to provide security to the encrypted data, in an embodiment. In step 1202, a node in a blockchain network starts an iterator, where client 650, 902 and server 652, 912 are nodes in the blockchain network. In step 1204, a transaction, which is data sent or received by client 650, 902 or data sent or received by server 652, 912, is verified. Verification of a transaction entails running a script against each transaction to determine if the encrypted transaction can be decrypted and checking the inputs and outputs of the transaction. In step 1206, the node adds the verified transaction to a memory pool in the node. In step 1210, the node then aggregates into a block the transactions in the memory pool in the node and in step 1212 forms and fills in the block header. In step 1214, the node releases the block to the blockchain network. In this manner, client 650, 902 and server 652, 912, as nodes in the blockchain network, can communicate with the security that a blockchain provides.

Thus, by splitting the neural network into a first and second portion and encrypting the transmission of data over a communications link between a client training engine and a server training engine, the training data of the neural network is not exposed to observers of the communications link. In addition, training performance is improved because the training workload can be balanced over the client training engine and the server training engine. Finally, intermediate values communicated between client 650, 902 and training service 652, 912 can be encrypted to maintain secrecy and then secured by an SSL and/or block chain protocol.

Though certain embodiments are described with splitting a neural network into a first and second portion, it should be noted that similar techniques as those discussed herein may be used to split a neural network into three or more portions. For example, the first k layers of a neural network may be run at the client, the next m layers run at a server, and the remaining layers run at the client. In such embodiments, the server only has intermediate data, and neither the original data nor the output data, thereby providing more security to the client's data. The layers may also be spread over multiple devices, thereby further reducing the amount of information any single device contains.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for training and using a neural network, the method comprising:
    splitting the neural network into a first portion and a second portion, the first portion having k layers and the second portion having one or more subsequent layers of the neural network, based on selecting a kth layer of the first portion as a splitting point;
    sending the first portion of the neural network to a client over a communications link, wherein, upon receipt of the first portion, the client applies one or more sets of inputs to the first portion of the neural network to create a batch of outputs;
    receiving the batch of outputs from the client over the communications link; and
    applying the batch of outputs received from the client to the second portion of the neural network to generate outputs.

2. The method of claim 1,
    wherein the one or more sets of inputs are a plurality of training inputs available to the client; and wherein the client applies the plurality of training inputs to the first portion of the neural network by forward-propagating each of the training inputs in the plurality of training inputs through the first portion of the neural network to generate the batch of outputs for the first portion of the neural network.

3. The method of claim 1,
wherein applying the batch of outputs received from the client to the second portion of the neural network includes training the second portion by:
forward-propagating each output in the batch of outputs received from the client through the second portion of the neural network to generate an output of the second portion; and
back propagating each output of the second portion through the layers of the second portion.

4. The method of claim 1,
wherein the one or more sets of inputs are one or more client inputs; and
wherein the client applies the one or more client inputs to the first portion of the neural network by performing an inference that includes forward-propagating each of the client inputs through the first portion of the neural network to generate the batch of outputs for the first portion of the neural network.

5. The method of claim 1,
wherein the one or more sets of inputs are one or more client inputs; and
wherein applying the batch of outputs received from the client to the second portion of the neural network includes performing an inference by forward-propagating each output in the batch of outputs received from the client through the second portion of the neural network to generate an output of the second portion.

6. The method of claim 1,
wherein receiving the batch of outputs from the client over the communications link includes receiving encrypted data representing the batch of outputs; further comprising decrypting the encrypted data.

7. The method of claim 1,
wherein receiving the batch of outputs from the client over the communications link includes receiving encrypted data representing the batch of outputs and an encrypted seed along with the encrypted data;
further comprising:
 sending the client a shared key table;
 decrypting the encrypted seed and using the decrypted seed to access the shared key table to form a key for decrypting the encrypted data; and
 decrypting the encrypted data with the key.

8. The method of claim 6, wherein the encrypted data is encrypted using a key derived from a key table and a one-time pad.

9. The method of claim 6, wherein the received encrypted data is secured using a secure socket layer protocol.

10. The method of claim 6, wherein the received encrypted data is secured in a transaction of a block in a blockchain.

11. The method of claim 1,
wherein applying the batch of outputs received from the client to the second portion of the neural network includes training the neural network by:
forward-propagating each output in the batch of outputs received from the client through the second portion of the neural network to generate an output of the second portion; and
back propagating each output of the second portion through the layers of both the second and first portions without back propagating each output through the first portion sent to the client.

12. A server system comprising:
one or more CPUs;
a network interface coupled to the one or more CPUs and to a communications link; and
a RAM having loaded therein an operating system and one or more applications that are run by the one or more CPUs, wherein one of the one or more applications is configured to:
split a neural network into a first portion and a second portion, the first portion having k layers and the second portion having one or more subsequent layers of the neural network, based on selecting a kth layer of the first portion as a splitting point;
send the first portion of the neural network to a client over a communications link, wherein, upon receipt of the first portion, the client applies one or more sets of inputs to the first portion of the neural network to create a batch of outputs for the first portion of the neural network;
receive the batch of outputs from the client over the communications link; and
apply the batch of outputs received from the client to the second portion of the neural network to generate outputs for the second portion.

13. The system of claim 12,
wherein the one or more sets of inputs are a plurality of training inputs available to the client; and
wherein the client applies the plurality of training inputs to the first portion of the neural network by forward-propagating each of the training inputs in the plurality of training inputs through the first portion of the neural network to generate the batch of outputs.

14. The system of claim 12,
wherein applying the batch of outputs received from the client to the second portion of the neural network includes being configured to train the second portion by:
forward-propagating each output in the batch of outputs received from the client through the second portion of the neural network to create an output for the second portion; and
back propagating each output of the second portion through the layers of the second portion for a partial back propagation or back propagating each output of the second portion through the layers of both the second and first portion for a full back propagation.

15. The system of claim 12,
wherein the one or more sets of inputs are one or more client inputs; and
wherein the client applies the one or more client inputs to the first portion of the neural network by performing an inference that includes forward-propagating each of the client inputs through the first portion of the neural network to generate the batch of outputs.

16. The system of claim 12,
wherein the one or more sets of inputs are one or more client inputs; and
wherein applying the batch of outputs received from the client to the second portion of the neural network includes being configured to perform an inference by forward propagating each output in the batch of outputs received from the client through the second portion of the neural network to create an output for the second portion.

17. A non-transitory computer-readable medium containing instructions, which when executed by one or more processors, cause the processors to carry out a method for training and using a neural network, wherein the method comprises:
   splitting the neural network into a first portion and a second portion, the first portion having k layers and the second portion having one or more subsequent layers of the neural network, based on selecting a kth layer of the first portion as a splitting point;
   sending the first portion of the neural network to a client over a communications link, wherein, upon receipt of the first portion, the client applies one or more sets of inputs to the first portion of the neural network to create a batch of outputs for the first portion of the neural network;
   receiving the batch of outputs from the client over the communications link; and
   applying the batch of outputs received from the client to the second portion of the neural network to generate outputs for the second portion.

18. The computer-readable medium of claim 17,
   wherein the one or more sets of inputs are a plurality of training inputs available to the client; and
   wherein the client applies the plurality of training inputs to the first portion of the neural network by forward-propagating each of the training inputs in the plurality of training inputs through the first portion of the neural network to generate the batch of outputs.

19. The computer-readable medium of claim 17,
   wherein applying the batch of outputs received from the client to the second portion of the neural network includes training the second portion by:
   forward-propagating each output in the batch of outputs received from the client through the second portion of the neural network to generate an output of the second portion; and
   back propagating each output of the second portion through the layers of the second portion for a partial back propagation or back propagating each output of the second portion through the layers of both the second and first portion for a full back propagation.

20. The computer-readable medium of claim 17,
   wherein the one or more sets of inputs are one or more client inputs; and
   wherein the client applies the one or more client inputs to the first portion of the neural network by performing an inference that includes forward-propagating each of the client inputs through the first portion of the neural network to generate the batch of outputs.

21. The computer-readable medium of claim 17,
   wherein the one or more sets of inputs are a plurality of client inputs; and
   wherein applying the batch of outputs received from the client to the second portion of the neural network includes performing an inference by forward-propagating each output in the batch of outputs received from the client through the second portion of the neural network to generate an output for the second portion.

* * * * *